US012790477B2

(12) United States Patent
McLeod et al.

(10) Patent No.: US 12,790,477 B2
(45) Date of Patent: Nov. 10, 2026

(54) CLARIFIED RANDOM ETHYLENE POLYPROPYLENE COPOLYMER

(71) Applicant: FINA TECHNOLOGY, INC., Houston, TX (US)

(72) Inventors: Michael McLeod, Houston, TX (US); Joachim Azzi, Houston, TX (US)

(73) Assignee: FINA TECHNOLOGY, INC., Houston, TX (US)

(*) Notice: Subject to any disclaimer, the term of this patent is extended or adjusted under 35 U.S.C. 154(b) by 529 days.

(21) Appl. No.: 18/370,664

(22) Filed: Sep. 20, 2023

(65) Prior Publication Data

US 2024/0101805 A1 Mar. 28, 2024

Related U.S. Application Data

(60) Provisional application No. 63/409,061, filed on Sep. 22, 2022.

(51) Int. Cl.

| | |
|---|---|
| ***C08L 23/16*** | (2006.01) |
| ***C08K 5/098*** | (2006.01) |
| ***C08K 5/1575*** | (2006.01) |

(52) U.S. Cl.

CPC .............. *C08L 23/16* (2013.01); *C08K 5/098* (2013.01); *C08K 5/1575* (2013.01); *C08L 2314/02* (2013.01)

(58) Field of Classification Search

CPC ........ C08L 23/16; C08K 5/098; C08K 5/1575

See application file for complete search history.

(56) References Cited

U.S. PATENT DOCUMENTS

| | | | | |
|---|---|---|---|---|
| 4,298,718 | A | 11/1981 | Mayr et al. | |
| 4,544,717 | A | 10/1985 | Mayr et al. | |
| 2022/0002528 | A1 * | 1/2022 | Rego | C08K 3/346 |

OTHER PUBLICATIONS

Gahleitner et al. "Nucleation of Polypropylene Homo-and Copolymers", *Intern. Polymer Processing XXVI,* 2011.

Lukaszewki and Hauck, "Polypropylene Clarification & Nucleation", *Moscow International Conference,* 2008.

Maier et al. "High efficiency clarifier for polypropylene", *SPE International Polyolefins Conference,* 2008.

* cited by examiner

*Primary Examiner* — Shane Fang

(74) *Attorney, Agent, or Firm* — NORTON ROSE FULBRIGHT US LLP

(57) ABSTRACT

Provided is a polymeric composition containing at least 98 wt. % of a random ethylene polypropylene copolymer and 0.01 wt. % to 1.0 wt. % of an acid neutralizer. The random ethylene polypropylene copolymer includes 4 wt. % to 12 wt. % of ethylene units and 88 wt. % to 96 wt. % of propylene units based on the total weight of the copolymer. The polymeric composition has a haze value of less than 40% as measured in accordance with ASTM D-1003 and a notched Izod impact strength of greater than 3 ft-lb/in as measured in accordance with ASTM D-256. The polymeric composition can further comprise a clarifier. Methods of making the polymeric composition and articles containing the polymeric composition are also provided.

33 Claims, 1 Drawing Sheet

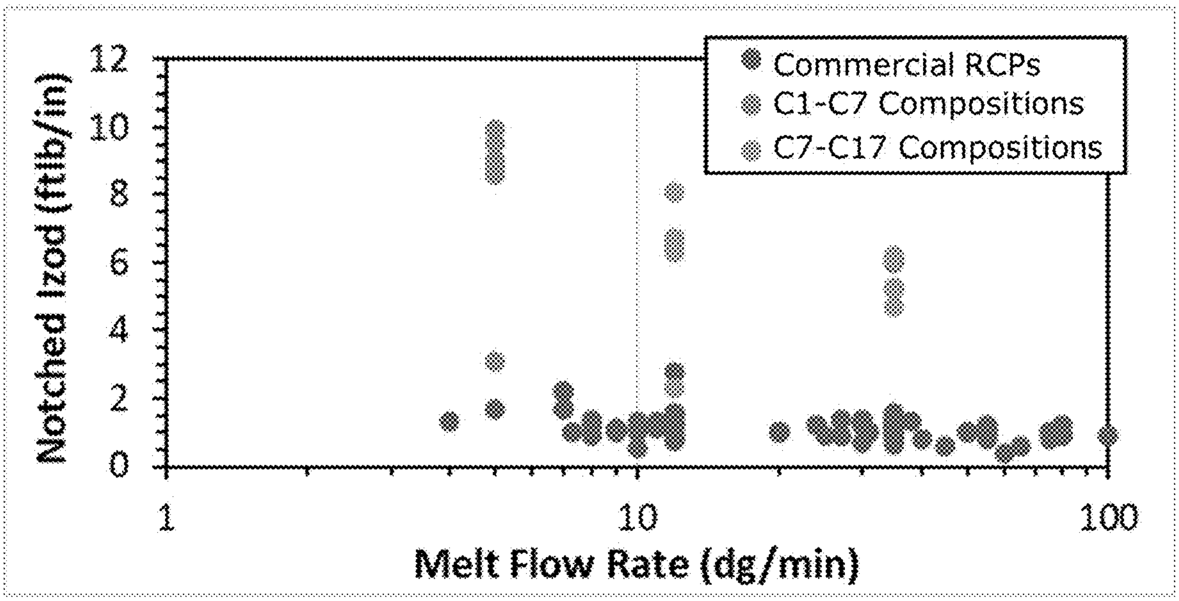
Commercial RCPs
C1-C7 Compositions
C7-C17 Compositions
Notched Izod (ftlb/in)
0
2
4
6
8
10
12
1
10
100
Melt Flow Rate (dg/min)

CLARIFIED RANDOM ETHYLENE POLYPROPYLENE COPOLYMER

CROSS REFERENCE TO RELATED APPLICATIONS

The present application claims the benefit of U.S. Provisional Application 63/409,061 filed Sep. 22, 2022, which is incorporated herein by reference in its entirety.

BACKGROUND OF THE INVENTION

A. Field of the Invention

The present invention concerns compositions containing random ethylene polypropylene that can have good clarity and impact strength characteristics. These characteristics can be achieved without having to rely on the use of a clarifier in the compositions.

B. Description of Related Art

Clarified random copolymers (RCPs) are ubiquitous in everyday life. They are used in products such as medical sharps containers, clear totes and bins, pipettes and other labware, food packaging containers, and a host of other applications. A sufficiently clear product with proficient impact performance could be utilized in these and other applications that are challenging to address except with specialty materials.

To develop RCPs with improved strength, current industrial practice is to blend elastomers and plastomers with clarified base resin. Common elastomers and plastomers for this purpose include VISTAMAXX™ (EXXONMOBIL®), ENGAGE™ (The Dow Chemical Company) and NOTIO® (Mitsui Plastics, Inc.) products. However, these blending agents are expensive and introduce additional manufacturing variables to be controlled, which can lead to reduced product quality.

Alternatively, incorporating higher amounts of ethylene into the RCP backbone has been proposed to reduce crystallinity and improve toughness, but this is likely to decrease product clarity because catalyst productivity is decreased at operating rates required to incorporate more ethylene. This, in turn, leads to more acidic catalyst residues that attack and consume commercial clarifiers, rendering them ineffective. Additionally, as more ethylene is incorporated, undesired byproducts such as low molecular weight amorphous species or low molecular weight polyethylene waxes are produced. These species differ sufficiently from the base polymer such that they phase separate and interfere with light transmission. For example, species unable to disperse in the polymer can migrate to the surface of molded parts and create a heterophasic structure that scatters light and creates an excessively diverse population of molecular architectures that generates varying indices of refraction within a molded part.

SUMMARY OF THE INVENTION

A discovery has been made that provides a solution to at least one or more of the aforementioned problems. In one aspect, the solution can include providing a composition having at least 98 wt. % of a random ethylene polypropylene copolymer and an acid neutralizer. It has been discovered that this combination can provide for ethylene polypropylene copolymer-based compositions having relatively high ethylene content to yield higher impact strength without sacrificing clarity. As illustrated in a non-limiting manner in the examples of this application, polymeric compositions of the present invention containing an ethylene polypropylene copolymer having equal to or higher than 4 wt. % of ethylene, based on the total weight of the copolymer, can have a notched Izod impact strength greater than 3 ft-lbs/in, as measured in accordance with ASTM D-256 at 23° C., and a haze value lower than 40%, as measured in accordance with ASTM D-1003, at a thickness of about 40 mil. These impact strength and clarity properties can be achieved without having to rely on the use of clarifiers or using low amounts of clarifiers (e.g., 0.01 wt. % to 1.0 wt. % or less than 750 parts per million (ppm), less than 500 ppm, or less than 250 ppm of a clarifier may be present in the compositions of the invention). Using lower amounts of clarifiers in the compositions or using no clarifies in the compositions can provide cost and/or production efficiencies for the compositions of the present invention.

One aspect of the present invention is directed to a polymeric composition. The polymeric composition can contain a random ethylene polypropylene copolymer, an acid neutralizer, a clarifier, or any combinations thereof. In some aspects, the polymeric composition does not include a clarifier. In some aspects, the polymeric composition can contain at least 98 wt. % (or 98.1, 98.2, 98.3, 98.4, 98.5, 98.6, 98.7. 98.8, 98.9, 99.0, 99.1, 99.2, 99.3, 99.4, 99.5, 99.6, 99.7, 99.8, or 99.9 wt. % or any range therein) of the random ethylene polypropylene copolymer, 0.01 wt. % to 1 wt. % (or 0.02, 0.03, 0.04, 0.05, 0.06, 0.07, 0.08, 0.09, 0.1, 0.2, 0.3, 0.4, 0.5, 0.6, 0.7, 0.8, 0.9 wt. % or any range therein) of an acid neutralizer, or 0.01 wt. % to 1 wt. % (or 0.02, 0.03, 0.04, 0.05, 0.06, 0.07, 0.08, 0.09, 0.1, 0.2, 0.3, 0.4, 0.5, 0.6, 0.7, 0.8, 0.9 wt. % or any range therein) of a clarifier, or any combinations thereof. In some aspects, the polymeric composition can contain the random ethylene polypropylene copolymer and the acid neutralizer. In some particular aspects, the polymeric composition can contain at least 98 wt. % of the random ethylene polypropylene copolymer and 0.01 wt. % to 1 wt. % of the acid neutralizer. In some aspects, the polymeric composition can contain the random ethylene polypropylene copolymer and the clarifier. In some particular aspects, the polymeric composition can contain at least 98 wt. % of the random ethylene polypropylene copolymer and 0.01 wt. % to 1 wt. % of the clarifier. In some aspects, the polymeric composition can contain the random ethylene polypropylene copolymer, the acid neutralizer, and the clarifier. In some particular aspects, the polymeric composition can contain at least 98 wt. % of the random ethylene polypropylene copolymer, 0.01 wt. % to 1 wt. % of the acid neutralizer, and 0.01 wt. % to 1 wt. % of the clarifier.

The polymeric composition can have a haze lower than the haze of random ethylene polypropylene copolymer, when measured under similar conditions. In some aspects, the polymeric composition can have a haze value at least 0.1, 0.5, 1, 2, 3 or 4 or more times lower than the haze value of the random ethylene polypropylene copolymer, wherein the haze values are measured in accordance with ASTM D-1003, at a thickness of about 40 mil. In some aspects, the polymeric composition has a haze value A and the random ethylene polypropylene copolymer has a haze value B, wherein $A \leq 0.75*B$, and wherein A and B are measured in accordance with ASTM D-1003, at a thickness of about 40 mil. In some aspects, A is equal to or less than 40%, 30%, 20%, or 15%. In some aspects, the polymeric composition has a haze value of 15% or less, such as 3% to 15%, measured in accordance with ASTM D-1003, at a thickness of about 20 mil or 40 mil. In some aspects, the polymeric composition has a haze value of 20% or less, such as 3% to 20%, measured in accordance with ASTM D-1003, at a thickness of about 40 mil or 60 mil. In some aspects, the polymeric composition has a haze value of 30% or less, such as 3% to 30%, measured in accordance with ASTM D-1003, at a thickness of about 80 mil.

The polymeric composition can have an impact strength greater than the impact strength of the random polypropylene copolymer, when measured under similar conditions. In some aspects, the polymeric composition has a notched Izod impact strength that is at least 0.1, 0.5, 1, 2, 3 or 4 or more times higher than the notched Izod impact strength of the random polypropylene copolymer, wherein the notched Izod impact strengths are measured in accordance with ASTM D-256 at 23° C. In some aspects, the polymeric composition has a notched Izod impact strength of C and the random polypropylene copolymer has a notched Izod impact strength of D, wherein C is ≥2*D, and wherein C and D are measured in accordance with ASTM D-256 at 23° C. In some aspects, C is 3 ft-lbs/in or greater, preferably 4 ft-lbs/in or greater, more preferably 5 ft-lbs/in or greater, and most preferably 6 ft-lbs/in or greater. In some aspects, the polymeric composition has a notched Izod impact strength of 3 ft-lbs/in or greater, such as 3 ft-lbs/in to 20 ft-lbs/in, measured in accordance with ASTM D-256 at 23° C. In some aspects, the polymeric composition has a notched Izod impact strength of 4 ft-lbs/in or greater, such as 4 ft-lbs/in to 20 ft-lbs/in, measured in accordance with ASTM D-256 at 23° C. In some aspects, the polymeric composition has a notched Izod impact strength of 5 ft-lbs/in or greater, such as 5 ft-lbs/in to 20 ft-lbs/in, measured in accordance with ASTM D-256 at 23° C. In some aspects, the polymeric composition has a notched Izod impact strength of 6 ft-lbs/in or greater, such as 6 ft-lbs/in to 20 ft-lbs/in, measured in accordance with ASTM D-256 at 23° C.

In certain aspects, the polymeric composition can contain 98 wt. % to 99.9 wt. %, such as greater than 98 wt. % to 99.8 wt. % of the random ethylene polypropylene copolymer. The random ethylene polypropylene copolymer can have relatively high ethylene content. In some aspects, the random ethylene polypropylene copolymer comprises 4 wt. % to 12 wt. % (or 5, 6, 7, 8, 9, 10, or 11 wt. % or any range therein) of ethylene units, and 88 wt. % to 96 wt. % of propylene units, based on the total weight of the copolymer. In some aspects, the random ethylene polypropylene copolymer comprises 5 wt. % to 12 wt. % of ethylene units and 88 wt. % to 95 wt. % of propylene units based on the total weight of the copolymer. In some aspects, the random ethylene polypropylene copolymer comprises 5.5 wt. % to 12 wt. % of ethylene units and 88 wt. % to 94.5 wt. % of propylene units based on the total weight of the copolymer. The random ethylene polypropylene copolymer can be a Ziegler-Natta random ethylene polypropylene copolymer. The Ziegler-Natta random ethylene polypropylene copolymer can be a random ethylene polypropylene copolymer prepared using a Ziegler-Natta catalyst. In some aspects, the random ethylene polypropylene copolymer is a pure random ethylene polypropylene copolymer. In some aspects, the random ethylene polypropylene copolymer is not a copolymer blend.

The random ethylene polypropylene copolymer, such as the Ziegler-Natta random ethylene polypropylene copolymer, can have a melt flow rate (MFR) of 5 dg/min to 35 dg/min, as measured in accordance with ASTM D-1238. In some aspects, the random ethylene polypropylene copolymer, such as the Ziegler-Natta random ethylene polypropylene copolymer, has an MFR of 5 dg/min. In some aspects, the random ethylene polypropylene copolymer, such as the Ziegler-Natta random ethylene polypropylene copolymer, has an MFR of 12 dg/min. In some aspects, the random ethylene polypropylene copolymer, such as the Ziegler-Natta random ethylene polypropylene copolymer, has an MFR of 35 dg/min.

The acid neutralizer can be a metal stearate, a M-Series catalyst neutralizer (e.g., M3L, M7L, M37L, M70P, M737LP, or any combination thereof, each of which is commercially available neutralizer from Mitsui Plastics, Inc. (White Plains, New York)). The M-Series catalyst neutralizer includes a metal stearate/metal oxide mixture of calcium stearate, zinc stearate, and zinc oxide. In some aspects, the M-Series catalyst neutralizer is M7L. In some aspects, metal stearate can be calcium stearate, zinc stearate, potassium stearate, sodium stearate, lithium stearate, aluminum stearate, magnesium stearate, manganese stearate, cobalt stearate, cerium stearate, copper stearate, ferric stearate, nickel stearate, or any combinations thereof. In particular aspects, the metal stearate is calcium stearate.

In some aspects, the clarifier can be a sorbitol-based clarifier, a nonitol-based clarifier, an amide-based clarifier, or any combinations thereof. In certain aspects, the sorbitol-based clarifier can be 1,3:2,4-Bis(3,4-dimethylobenzylideno) sorbitol, also known as MILLAD® 3988 (Milliken). In certain aspects, the nonitol-based clarifier can be 1,2,3-trideoxy-4,6:5,7-bis-0-((4-propylphenyl)methylene) nonitol, also known as MILLAD® NX® 8000 (Milliken). In certain aspects, the amide-based clarifier can be N-[3,5-bis-(2,2-dimethyl-propionylamino)-phenyl]-2,2-dimethylpropionamide, also known as IRGACLEAR® XT 386 (BASF). In some aspects, the polymeric composition includes less than 750 parts per million (ppm) of a clarifier. In some aspects, the polymeric composition includes less than 500 parts per million (ppm) of a clarifier. In some aspects, the polymeric composition includes less than 250 parts per million (ppm) of a clarifier. In certain aspects, the polymeric compositions does not include a clarifier.

In certain aspects, the polymeric composition further comprising one or more additives selected from an antioxidant, a stabilizer, a peroxide, a slip agent, an antistatic additive, an FR additive, a light stabilizer, a flow modifiers, a process aid, an anti-block agent, an optical brightener, or any combinations thereof. In some particular aspects, the one or more additives can be an antioxidant and/or a stabilizer. In some aspects, the antioxidant can be a sterically hindered phenol-based antioxidant (e.g., pentaerythritol tetrakis(3-(3,5-di-tert-butyl-4-hydroxyphenyl)propionate [IRGANOX® 1010, BASF]). In some aspects, the stabilizer can be a hydrolytically stable phosphite-based stabilizer (e.g., tris(2,4-di-tert.-butylphenyl)phosphite) [IRGAFOS® 168, BASF]).

In certain aspects, the polymeric composition can contain: i) 98 wt. % to 99.8 wt. % of a Ziegler-Natta random ethylene polypropylene copolymer, containing 5.5 wt. % to 12 wt. % of ethylene units, and 88 wt. % to 94.5 wt. % of propylene units based on the total weight of the copolymer, ii) 0.01 wt. % to 0.1 wt. %, such as 0.04 wt. % to 0.06 wt. % of an acid neutralizer, and iii) 0.1 wt. % to 1.0 wt. %, such as 0.1 wt. % to 0.3 wt. %, of a clarifier. In specific aspects, the polymeric composition contains: i) 98 wt. % to 99.8 wt. % of a Ziegler-Natta random ethylene polypropylene copolymer, containing 5.5 wt. % to 12 wt. % of ethylene units, and 88 wt. % to 94.5 wt. % of propylene units based on the total weight of the copolymer, ii) 0.05 wt. % of an acid neutralizer, and iii) 0.2 wt. % of a clarifier. In some aspects, the acid neutralizer is a metal stearate. In specific aspects, the acid neutralizer is calcium stearate. In some aspects, the clarifier is a sorbitol-based clarifier. In specific aspects, the clarifier is 3,4-dimethylbenzylidene sorbitol. In certain aspects, the polymeric composition further includes: iv) 0.01 wt. % to 0.3 wt. % of an antioxidant and v) 0.01 wt. % to 0.3 wt. % of a stabilizer. In specific aspects, the polymeric composition further includes: iv) 0.08 wt. % of an antioxidant and v) 0.05 wt. % of a stabilizer. In some aspects, the stabilizer is a phosphite-containing stabilizer. In specific aspects, the stabilizer is tris(2,4-di-tert.-butylphenyl)phosphite. In specific aspects, the antioxidant is pentaerythritol tetrakis(3-(3,5-di-tert-butyl-4-hydroxyphenyl)propionate).

In certain aspects, the polymeric composition can contain: i) 98 wt. % to 99.8 wt. % of a Ziegler-Natta random ethylene polypropylene copolymer, containing 5.5 wt. % to 12 wt. % of ethylene units, and 12 wt. % to 94.5 wt. % of propylene units based on the total weight of the copolymer, ii) 0.01 wt. % to 1.0 wt. %, such as 0.05 wt. % to 0.5 wt. % of the acid neutralizer, and iii) 0.1 wt. % to 1.0 wt. %, such as 0.2 wt. % to 0.4 wt. %, of a clarifier. In specific aspects, the polymeric composition contains: i) 98 wt. % to 99.8 wt. % of a Ziegler-Natta random ethylene polypropylene copolymer, containing 5.5 wt. % to 12 wt. % of ethylene units, and 88 wt. % to 94.5 wt. % of propylene units based on the total weight of the copolymer, ii) 0.05 wt. % of an acid neutralizer, and iii) 0.2 wt. % of a clarifier. In specific aspects, the polymeric composition contains: i) 98 wt. % to 99.8 wt. % of a Ziegler-Natta random ethylene polypropylene copolymer, containing 5.5 wt. % to 12 wt. % of ethylene units, and 88 wt. % to 94.5 wt. % of propylene units based on the total weight of the copolymer, ii) 0.5 wt. % of an acid neutralizer, and iii) 0.2 wt. % of a clarifier. In specific aspects, the polymeric composition contains: i) 98 wt. % to 99.8 wt. % of a Ziegler-Natta random ethylene polypropylene copolymer, containing 5.5 wt. % to 12 wt. % of ethylene units, and 88 wt. % to 94.5 wt. % of propylene units based on the total weight of the copolymer, ii) 0.5 wt. % of an acid neutralizer, and iii) 0.4 wt. % of a clarifier. In some aspects, the acid neutralizer is a metal stearate. In specific aspects, the acid neutralizer is calcium stearate. In some aspects, the clarifier is a nonitol-based clarifier. In specific aspects, the clarifier is 1,2,3-trideoxy-4,6:5,7-bis-0-((4-propylphenyl)methylene) nonitol. In certain aspects, the polymeric composition further includes: iv) 0.01 wt. % to 0.3 wt. % of an antioxidant; and v) 0.01 wt. % to 0.3 wt. % of a stabilizer. In specific aspects, the polymeric composition further includes: iv) 0.08 wt. % of an antioxidant; and v) 0.05 wt. % of a stabilizer. In some aspects, the stabilizer is a phosphite-containing stabilizer. In specific aspects, the stabilizer is tris(2,4-di-tert.-butylphenyl)phosphite. In specific aspects, the antioxidant is pentaerythritol tetrakis(3-(3,5-di-tert-butyl-4-hydroxyphenyl)propionate).

In certain aspects, the polymeric composition can contain: i) 98 wt. % to 99.8 wt. % of a Ziegler-Natta random ethylene polypropylene copolymer, containing 5.5 wt. % to 12 wt. % of ethylene units, and 12 wt. % to 94.5 wt. % of propylene units based on the total weight of the copolymer, ii) 0.01 wt. % to 0.1 wt. %, such as 0.04 wt. % to 0.06 wt. % of the acid neutralizer, and iii) 0.01 wt. % to 0.1 wt. %, such as 0.01 wt. % to 0.03 wt. %, of a clarifier. In specific aspects, the polymeric composition contains i) 98 wt. % to 99.8 wt. % of a Ziegler-Natta random ethylene polypropylene copolymer, containing 5.5 wt. % to 12 wt. % of ethylene units, and 88 wt. % to 94.5 wt. % of propylene units based on the total weight of the copolymer, ii) 0.05 wt. % of an acid neutralizer, and iii) 0.02 wt. % of a clarifier. In some aspects, the acid neutralizer is a metal stearate. In specific aspects, the acid neutralizer is calcium stearate. In some aspects, the clarifier is an amide-based clarifier. In specific aspects, the clarifier is N-[3,5-bis-(2,2-dimethyl-propionylamino)-phenyl]-2,2-dimethylpropionamide. In certain aspects, the polymeric composition further includes: iv) 0.01 wt. % to 0.3 wt. % of an antioxidant and v) 0.01 wt. % to 0.3 wt. % of a stabilizer. In specific aspects, the polymeric composition further includes: iv) 0.08 wt. % of an antioxidant and v) 0.05 wt. % of a stabilizer. In some aspects, the stabilizer is a phosphite-containing stabilizer. In specific aspects, the stabilizer is tris(2,4-di-tert.-butylphenyl)phosphite. In specific aspects, the antioxidant is pentaerythritol tetrakis(3-(3,5-di-tert-butyl-4-hydroxyphenyl)propionate).

In certain aspects, the polymeric composition can contain: i) 98 wt. % to 99.8 wt. % of a Ziegler-Natta random ethylene polypropylene copolymer, containing 5.5 wt. % to 12 wt. % of ethylene units, and 12 wt. % to 94.5 wt. % of propylene units based on the total weight of the copolymer, ii) 0.01 wt. % to 0.75 wt. %, such as 0.05 wt. % to 0.5 wt. %, of the acid neutralizer, and iii) 0.1 wt. % to 1 wt. %, such as 0.4 wt. % to 0.6 wt. %, of a clarifier. In specific aspects, the polymeric composition contains i) 98 wt. % to 99.8 wt. % of a Ziegler-Natta random ethylene polypropylene copolymer, containing 5.5 wt. % to 12 wt. % of ethylene units, and 88 wt. % to 94.5 wt. % of propylene units based on the total weight of the copolymer, ii) 0.05 wt. % of an acid neutralizer, and iii) 0.5 wt. % of a clarifier. In specific aspects, the polymeric composition contains i) 98 wt. % to 99.8 wt. % of a Ziegler-Natta random ethylene polypropylene copolymer, containing 5.5 wt. % to 12 wt. % of ethylene units, and 88 wt. % to 94.5 wt. % of propylene units based on the total weight of the copolymer, ii) 0.3 wt. % of an acid neutralizer, and iii) 0.5 wt. % of a clarifier. In specific aspects, the polymeric composition contains i) 98 wt. % to 99.8 wt. % of a Ziegler-Natta random ethylene polypropylene copolymer, containing 5.5 wt. % to 12 wt. % of ethylene units, and 88 wt. % to 94.5 wt. % of propylene units based on the total weight of the copolymer, ii) 0.5 wt. % of an acid neutralizer, and iii) 0.5 wt. % of a clarifier. In some aspects, the acid neutralizer is a metal stearate. In specific aspects, the acid neutralizer is calcium stearate. In some aspects, the acid neutralizer is a M7L. In some aspects, the clarifier is a nonitol-based clarifier, such as 1,2,3-trideoxy-4,6:5,7-bis-0-((4-propylphenyl)methylene) nonitol. In certain aspects, the polymeric composition further includes: iv) 0.01 wt. % to 0.3 wt. % of an antioxidant and v) 0.01 wt. % to 0.3 wt. % of a stabilizer. In specific aspects, the polymeric composition further includes: iv) 0.08 wt. % of an antioxidant and v) 0.05 wt. % of a stabilizer. In some aspects, the stabilizer is a phosphite-containing stabilizer. In specific aspects, the stabilizer is tris(2,4-di-tert.-butylphenyl)phosphite. In specific aspects, the antioxidant is pentaerythritol tetrakis(3-(3,5-di-tert-butyl-4-hydroxyphenyl)propionate).

In certain aspects, the polymeric composition can contain: i) 98 wt. % to 99.8 wt. % of a Ziegler-Natta random ethylene polypropylene copolymer, containing 5.5 wt. % to 12 wt. % of ethylene units, and 12 wt. % to 94.5 wt. % of propylene units based on the total weight of the copolymer, ii) 0.01 wt. % to 0.1 wt. %, such as 0.04 wt. % to 0.06 wt. %, of the acid neutralizer, and iii) 0.01 wt. % to 0.1 wt. %, such as 0.01 to 0.03 wt. %, of a clarifier. In specific aspects, the polymeric composition contains i) 98 wt. % to 99.8 wt. % of a Ziegler-Natta random ethylene polypropylene copolymer, containing 5.5 wt. % to 12 wt. % of ethylene units, and 88 wt. % to 94.5 wt. % of propylene units based on the total weight of the copolymer, ii) 0.05 wt. % of an acid neutralizer, and iii) 0.02 wt. % of a clarifier. In some aspects, the acid neutralizer is a metal stearate. In specific aspects, the acid neutralizer is calcium stearate. In some aspects, the acid neutralizer is a M7L. In some aspects, the clarifier is an amide-based clarifier, such as N-[3,5-bis-(2,2-dimethyl-propionylamino)-phenyl]-2,2-dimethylpropionamide. In certain aspects, the polymeric composition further includes: iv) 0.01 wt. % to 0.3 wt. % of an antioxidant and v) 0.01 wt. % to 0.3 wt. % of a stabilizer. In specific aspects, the polymeric composition further includes: iv) 0.08 wt. % of an antioxidant and v) 0.05 wt. % of a stabilizer. In some aspects, the stabilizer is a phosphite-containing stabilizer. In specific aspects, the stabilizer is tris(2,4-di-tert.-butylphenyl)phosphite. In specific aspects, the antioxidant is pentaerythritol tetrakis(3-(3,5-di-tert-butyl-4-hydroxyphenyl)propionate).

In certain aspects, the polymeric composition can contain less than 0.1 wt. %, such as less than 0.01 wt. %, or free of, or essentially free of ultra-high molecular wt. siloxane, random-heterophasic polypropylene copolymers, ethylene-propylene copolymer waxes, and/or metallocene waxes.

The polymeric composition described herein can be an extruded, a blow-molded, an injection-molded, rotational molded, compression molded, and/or thermoformed composition. In certain aspects, the composition can be in form of a sheet and/or film. Certain aspects are directed to an article of manufacture containing a polymeric composition described herein. In some aspects, the article of manufacture can be transparent. In some aspects, the article of manufacture can be a medical sharps container, tote, bins, pipettes, laboratory ware, food packaging container, food storage container, cooking utensil, plate, cup, cavity tray, drinking cup, measuring cup, strainer, turkey baster, non-food storage container, filing cabinet, cabinet drawer, general storage device, organizer, sweater box, rigid packaging, deli container, deli container lid, dairy container, dairy container lid, personal care product bottle and jar, furniture, furniture component, building material and building container components, film, coating, fiber, bag, adhesive, yarn and fabric blister, or clamshell.

Also disclosed in the context of the present invention are aspects 1-34. Aspect 1 is a polymeric composition comprising: at least 98 wt. % of a random ethylene polypropylene copolymer, wherein the random ethylene polypropylene copolymer comprises 4 wt. % to 12 wt. % of ethylene units and 88 wt. % to 96 wt. % of propylene units based on the total weight of the copolymer; and 0.01 wt. % to 1.0 wt. % of an acid neutralizer, wherein the polymeric composition has a haze value of less than 40% as measured in accordance with ASTM D-1003; and wherein the polymeric composition has a notched Izod impact strength of greater than 3 ft-lb/in as measured in accordance with ASTM D-256. Aspect 2 is the polymeric composition of aspect 1, wherein the polymeric composition comprises: at least 98 wt. % of the random ethylene polypropylene copolymer, wherein the random ethylene polypropylene copolymer comprises 5.5 wt. % to 12 wt. % of ethylene units and 88 wt. % to 94.5 wt. % of propylene units based on the total weight of the copolymer; and 0.03 wt. % to 1 wt. % of the acid neutralizer. Aspect 3 is the polymeric composition of any aspects 1 to 2, wherein the polymeric composition includes a clarifier at 0.01 wt. % to 1.0 wt. %. Aspect 4 is the polymeric composition of any one of aspects 1 to 3, wherein the polymeric composition includes less than 750 parts per million (ppm), less than 500 ppm, or less than 250 ppm of a clarifier. Aspect 5 is the polymeric composition of any one of aspects 3 to 4, wherein the clarifier is a sorbitol based clarifier, a nonitol based clarifier, an amide based clarifier, or any combinations thereof. Aspect 6 is the polymeric composition of any one of aspects 3 to 5, wherein the clarifier is 1,2,3-trideoxy-4,6:5,7-bis-0-((4-propylphenyl)methylene) nonitol, N-[3,5-bis-(2,2-dimethyl-propionylamino)-phenyl]-2,2-dimethylpropionamide, or any combinations thereof. Aspect 7 is the polymeric composition of any one of aspects 1 to 2, wherein the polymeric composition does not include a clarifier. Aspect 8 is the polymeric composition of any one of aspects 1 to 7, wherein the polymeric composition has a haze value A and the random ethylene polypropylene copolymer has a haze value B, wherein $A \leq 0.75*B$, and wherein A and B are measured in accordance with ASTM D-1003, at a thickness of about 40 mil. Aspect 9 is the polymeric composition of aspect 8, wherein A is equal to or less than 40%, preferably less than 30%, more preferably less than 20%, and most preferably less than 15%. Aspect 10 is the polymeric composition of any one of aspects 1 to 9, wherein the polymeric composition has a notched Izod impact strength of C and the random polypropylene copolymer has a notched Izod impact strength of D, wherein C is $\geq 2*D$, and wherein C and D are measured in accordance with ASTM D-256 at 23° C. Aspect 11 is the polymeric composition of aspect 10, wherein C is 3 ft-lbs/in or greater, preferably 4 ft-lbs/in or greater, more preferably 5 ft-lbs/in or greater, and most preferably 6 ft-lbs/in or greater. Aspect 12 is the polymeric composition of any one of aspects 1 to 11, wherein the polymeric composition comprises greater than 98 wt. % up to 99.8 wt. % of the random ethylene polypropylene copolymer. Aspect 13 is the polymeric composition of any one of aspects 1 to 12, wherein the random ethylene polypropylene copolymer is a Ziegler-Natta random ethylene polypropylene copolymer. Aspect 14 is the polymeric composition of any one of aspects 1 to 13, wherein the acid neutralizer is a metal stearate comprising calcium stearate, zinc stearate, potassium stearate, sodium stearate, lithium stearate, aluminum stearate, magnesium stearate, manganese stearate, cobalt stearate, cerium stearate, copper stearate, ferric stearate, nickel stearate, or any combinations thereof, preferably wherein the metal stearate is calcium stearate. Aspect 15 is the polymeric composition of any one of aspects 1 to 14, further comprising one or more additives selected from an antioxidant, a stabilizer, a peroxide, a slip agent, an antistatic additive, an FR additive, a light stabilizer, a flow modifiers, a process aid, an anti-block agent, an optical brightener, or any combinations thereof. Aspect 16 is the polymeric composition of aspect 1, comprising: 98 wt. % to 99.8 wt. % of a Ziegler-Natta random ethylene polypropylene copolymer, comprising 5.5 wt. % to 12 wt. % of ethylene units and 88 wt. % to 94.5 wt. % of propylene units based on the total weight of the copolymer; 0.01 wt. % to 0.1 wt. %, preferably 0.04 wt. % to 0.06 wt. %, of the acid neutralizer; and 0.1 wt. % to 1.0 wt. %, preferably 0.1 wt. % to 0.3 wt. %, of a clarifier. Aspect 17 is the polymeric composition of aspect 16, wherein the acid neutralizer is a metal stearate, preferably calcium stearate, and wherein the clarifier is a sorbitol-based clarifier, preferably 3,4-dimethylbenzylidene sorbitol. Aspect 18 is the polymeric composition of aspect 1, comprising: 98 wt. % to 99.8 wt. % of a Ziegler-Natta random ethylene polypropylene copolymer, comprising 5.5 wt. % to 12 wt. % of ethylene units and 88 wt. % to 94.5 wt. % of propylene units based on the total weight of the copolymer; 0.01 wt. % to 1.0 wt. %, preferably 0.05 wt. % to 0.5 wt. %, of the acid neutralizer; and 0.1 wt. % to 1.0 wt. %, preferably 0.2 wt. % to 0.4 wt. %, of a clarifier. Aspect 19 is the polymeric composition of aspect 18, wherein the acid neutralizer is a metal stearate, preferably calcium stearate, and wherein the clarifier is a nonitol-based clarifier, preferably 1,2,3-trideoxy-4,6:5,7-bis-0-((4-propylphenyl)methylene)

nonitol. Aspect 20 is the polymeric composition of aspect 1, comprising: 98 wt. % to 99.8 wt. % of a Ziegler-Natta random ethylene polypropylene copolymer, comprising 5.5 wt. % to 12 wt. % of ethylene units and 88 wt. % to 94.5 wt. % of propylene units, based on the total weight of the copolymer; 0.01 wt. % to 0.1 wt. %, preferably 0.04 wt. % to 0.06 wt. %, of the acid neutralizer; and 0.01 wt. % to 0.1 wt. %, preferably 0.01 wt. % to 0.03 wt. %, of a clarifier. Aspect 21 is the polymeric composition of aspect 20, wherein the acid neutralizer is a metal stearate, preferably calcium stearate, and wherein the clarifier is an amide-based clarifier, preferably N-[3,5-bis-(2,2-dimethyl-propionylamino)-phenyl]-2,2-dimethylpropionamide. Aspect 22 is the polymeric composition of aspect 1, comprising: 98 wt. % to 99.8 wt. % of a Ziegler-Natta random ethylene polypropylene copolymer, comprising 5.5 wt. % to 12 wt. % of ethylene units and 88 wt. % to 94.5 wt. % of propylene units, based on the total weight of the copolymer; 0.01 wt. % to 0.75 wt. %, preferably 0.05 wt. % to 0.5 wt. %, of the acid neutralizer; and 0.1 wt. % to 1 wt. %, preferably 0.4 wt. % to 0.6 wt. %, of a clarifier. Aspect 23 is the polymeric composition of aspect 22, wherein the acid neutralizer is a metal stearate, preferably calcium stearate, and wherein the clarifier is a nonitol-based clarifier, preferably 1,2,3-trideoxy-4,6:5,7-bis-0-((4-propylphenyl)methylene) nonitol. Aspect 24 is the polymeric composition of aspect 22, wherein the acid neutralizer is M7L, and wherein the clarifier is a nonitol-based clarifier, preferably 1,2,3-trideoxy-4,6:5,7-bis-0-((4-propylphenyl)methylene) nonitol. Aspect 25 is the polymeric composition of aspect 1, comprising: 98 wt. % to 99.8 wt. % of a Ziegler-Natta random ethylene polypropylene copolymer, comprising 5.5 wt. % to 12 wt. % of ethylene units and 88 wt. % to 94.5 wt. % of propylene units, based on the total weight of the copolymer; 0.01 wt. % to 0.1 wt. %, preferably 0.04 wt. % to 0.06 wt. %, of the acid neutralizer; and 0.01 wt. % to 0.1 wt. %, preferably 0.01 to 0.03 wt. %, of a clarifier. Aspect 26 is the polymeric composition of aspect 22, wherein the acid neutralizer is a metal stearate, preferably calcium stearate, and wherein the clarifier is an amide-based clarifier, preferably N-[3,5-bis-(2,2-dimethyl-propionylamino)-phenyl]-2,2-dimethylpropionamide. Aspect 27 is the polymeric composition of aspect 22, wherein the acid neutralizer is M7L, and wherein the clarifier is an amide-based clarifier, preferably N-[3,5-bis-(2,2-dimethyl-propionylamino)-phenyl]-2,2-dimethylpropionamide. Aspect 28 is the polymeric composition of any one of aspects 16 to 27, further comprising 0.01 wt. % to 0.3 wt. % of an antioxidant and 0.01 wt. % to 0.3 wt. % of a stabilizer. Aspect 29 is the polymeric composition of claim 28, wherein the antioxidant is a hindered phenol-based antioxidant and the stabilizer is a phosphite-based stabilizer. Aspect 30 is the polymeric composition of aspect 1, wherein the composition is an extruded, a blow-molded, an injection-molded, rotational molded, compression molded, and/or thermoformed composition. Aspect 31 is the polymeric composition of aspect 1, wherein the composition is a sheet or film. Aspect 32 is an article of manufacture comprising the polymeric composition of any one of aspect 1 to 31. Aspect 33 is the article of manufacture of aspect 32, wherein the article of manufacture is transparent. Aspect 34 is the article of manufacture of aspect 32, wherein the article of manufacture is a medical sharps container, tote, bins, pipettes, laboratory ware, food packaging container, food storage container, cooking utensil, plate, cup, cavity tray, drinking cup, measuring cup, strainer, turkey baster, non-food storage container, filing cabinet, cabinet drawer, general storage device, organizer, sweater box, rigid packaging, deli container, deli container lid, dairy container, dairy container lid, personal care product bottle and jar, furniture, furniture component, building material and building container components, film, coating, fiber, bag, adhesive, yarn and fabric blister, or clamshell Other embodiments of the invention are discussed throughout this application. Any embodiment discussed with respect to one aspect of the invention applies to other aspects of the invention as well and vice versa. Each embodiment described herein is understood to be embodiments of the invention that are applicable to other aspects of the invention. It is contemplated that any embodiment or aspect discussed herein can be combined with other embodiments or aspects discussed herein and/or implemented with respect to any method or composition of the invention, and vice versa. Furthermore, compositions and systems of the invention can be used to achieve methods of the invention.

The following includes definitions of various terms and phrases used throughout this specification.

The terms "about" or "approximately" are defined as being close to as understood by one of ordinary skill in the art. In one non-limiting embodiment, the terms are defined to be within 10%, alternatively within 5%, alternatively within 1%, and alternatively within 0.5%.

The terms "wt. %," "vol. %," or "mol. %" refer to a weight percentage of a component, a volume percentage of a component, or molar percentage of a component, respectively, based on the total weight, the total volume of material, or total moles, that includes the component. In a non-limiting example, 10 grams of component in 100 grams of the material is 10 wt. % of component. The terms "ppm" refer to parts per million by weight of a component, based on the total weight, that includes the component.

The term "substantially" and its variations are defined to include ranges within 10%, within 5%, within 1%, or within 0.5%.

The terms "inhibiting" or "reducing" or "preventing" or "avoiding" or any variation of these terms, when used in the claims and/or the specification include any measurable decrease or complete inhibition to achieve a desired result.

The term "effective," as that term is used in the specification and/or claims, means adequate to accomplish a desired, expected, or intended result.

The use of the words "a" or "an" when used in conjunction with any of the terms "comprising," "including," "containing," or "having" in the claims, or the specification, may mean "one," but it is also consistent with the meaning of "one or more," "at least one," and "one or more than one."

The phrase "and/or" can include "and" or "or." To illustrate, A, B, and/or C can include: A alone, B alone, C alone, a combination of A and B, a combination of A and C, a combination of B and C, or a combination of A, B, and C.

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The process and systems of the present invention can "comprise," "consist essentially of," or "consist of" particular ingredients, components, compositions, steps, etc. disclosed throughout the specification. With respect to the transitional phrase "consisting essentially of," in one non-limiting aspect, a basic and novel characteristic of the compositions and processes of the present invention are polymeric composition containing a random ethylene polypropylene copolymer and an acid neutralizer. The polymeric compositions can have (1) a haze value lower than the random ethylene polypropylene copolymer when measured under similar conditions, and/or (2) an impact strength higher than the random ethylene polypropylene copolymer when measured under similar conditions. These properties can be obtained while using relatively low or no clarifiers in the compositions.

Other objects, features and advantages of the present invention will become apparent from the following figures, detailed description, and examples. It should be understood, however, that the figures, detailed description, and examples, while indicating specific embodiments of the invention, are given by way of illustration only and are not meant to be limiting. Additionally, it is contemplated that changes and modifications within the spirit and scope of the invention will become apparent to those skilled in the art from this detailed description. In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

The following drawings form part of the present specification and are included to further demonstrate certain aspects of the present disclosure. The invention may be better understood by reference to one or more of these drawings in combination with the detailed description of specific aspects presented below.

The FIGURE compares notched Izod values (ft-lb/in) versus melt flow rate (MFR) (dg/min) for existing North American commercial RCP products and for RCP compositions according to embodiments of the present disclosure.

DETAILED DESCRIPTION OF THE INVENTION

A polymeric composition of the present invention can include at least 98 wt. % of a random ethylene polypropylene copolymer, wherein the random ethylene polypropylene copolymer comprises 4 wt. % to 12 wt. % of ethylene units and 88 wt. % to 96 wt. % of propylene units based on the total weight of the copolymer and 0.01 wt. % to 1.0 wt. % of an acid neutralizer. The composition can have a haze value of less than 40% as measured in accordance with ASTM D-1003 and a notched Izod impact strength of greater than 3 ft-lb/in as measured in accordance with ASTM D-256. These features can be obtained while using low amounts of clarifiers or no clarifiers at all, which can be advantageous in that it can reduce the complexity of the compositions, reduce the costs of producing the compositions, and/or reduce the steps for making the compositions of the present invention. These and other non-limiting aspects of the present invention are discussed in further detail in the following sections.

A. Polymeric Composition

The polymeric composition of the present disclosure can contain at least 98 wt. %, such as 98 wt. % to 99.9 wt. %, or at least any one of, at most any one of, equal to any one of, or between any two of 98 wt. %, 98.01 wt. %, 98.02 wt. %, 98.03 wt. %, 98.04 wt. %, 98.05 wt. %, 98.06 wt. %, 98.07 wt. %, 98.08 wt. %, 98.09 wt. %, 98.1 wt. %, 98.11 wt. %, 98.12 wt. %, 98.13 wt. %, 98.14 wt. %, 98.15 wt. %, 98.16 wt. %, 98.17 wt. %, 98.18 wt. %, 98.19 wt. %, 98.2 wt. %, 98.21 wt. %, 98.22 wt. %, 98.23 wt. %, 98.24 wt. %, 98.25 wt. %, 98.26 wt. %, 98.27 wt. %, 98.28 wt. %, 98.29 wt. %, 98.3 wt. %, 98.31 wt. %, 98.32 wt. %, 98.33 wt. %, 98.34 wt. %, 98.35 wt. %, 98.36 wt. %, 98.37 wt. %, 98.38 wt. %, 98.39 wt. %, 98.4 wt. %, 98.41 wt. %, 98.42 wt. %, 98.43 wt. %, 98.44 wt. %, 98.45 wt. %, 98.46 wt. %, 98.47 wt. %, 98.48 wt. %, 98.49 wt. %, 98.5 wt. %, 98.51 wt. %, 98.52 wt. %, 98.53 wt. %, 98.54 wt. %, 98.55 wt. %, 98.56 wt. %, 98.57 wt. %, 98.58 wt. %, 98.59 wt. %, 98.6 wt. %, 98.61 wt. %, 98.62 wt. %, 98.63 wt. %, 98.64 wt. %, 98.65 wt. %, 98.66 wt. %, 98.67 wt. %, 98.68 wt. %, 98.69 wt. %, 98.7 wt. %, 98.71 wt. %, 98.72 wt. %, 98.73 wt. %, 98.74 wt. %, 98.75 wt. %, 98.76 wt. %, 98.77 wt. %, 98.78 wt. %, 98.79 wt. %, 98.8 wt. %, 98.81 wt. %, 98.82 wt. %, 98.83 wt. %, 98.84 wt. %, 98.85 wt. %, 98.86 wt. %, 98.87 wt. %, 98.88 wt. %, 98.89 wt. %, 98.9 wt. %, 98.91 wt. %, 98.92 wt. %, 98.93 wt. %, 98.94 wt. %, 98.95 wt. %, 98.96 wt. %, 98.97 wt. %, 98.98 wt. %, 98.99 wt. %, 99 wt. %, 99.01 wt. %, 99.02 wt. %, 99.03 wt. %, 99.04 wt. %, 99.05 wt. %, 99.06 wt. %, 99.07 wt. %, 99.08 wt. %, 99.09 wt. %, 99.1 wt. %, 99.11 wt. %, 99.12 wt. %, 99.13 wt. %, 99.14 wt. %, 99.15 wt. %, 99.16 wt. %, 99.17 wt. %, 99.18 wt. %, 99.19 wt. %, 99.2 wt. %, 99.21 wt. %, 99.22 wt. %, 99.23 wt. %, 99.24 wt. %, 99.25 wt. %, 99.26 wt. %, 99.27 wt. %, 99.28 wt. %, 99.29 wt. %, 99.3 wt. %, 99.31 wt. %, 99.32 wt. %, 99.33 wt. %, 99.34 wt. %, 99.35 wt. %, 99.36 wt. %, 99.37 wt. %, 99.38 wt. %, 99.39 wt. %, 99.4 wt. %, 99.41 wt. %, 99.42 wt. %, 99.43 wt. %, 99.44 wt. %, 99.45 wt. %, 99.46 wt. %, 99.47 wt. %, 99.48 wt. %, 99.49 wt. %, 99.5 wt. %, 99.51 wt. %, 99.52 wt. %, 99.53 wt. %, 99.54 wt. %, 99.55 wt. %, 99.56 wt. %, 99.57 wt. %, 99.58 wt. %, 99.59 wt. %, 99.6 wt. %, 99.61 wt. %, 99.62 wt. %, 99.63 wt. %, 99.64 wt. %, 99.65 wt. %, 99.66 wt. %, 99.67 wt. %, 99.68 wt. %, 99.69 wt. %, 99.7 wt. %, 99.71 wt. %, 99.72 wt. %, 99.73 wt. %, 99.74 wt. %, 99.75 wt. %, 99.76 wt. %, 99.77 wt. %, 99.78 wt. %, 99.79 wt. %, 99.8 wt. %, 99.81 wt. %, 99.82 wt. %, 99.83 wt. %, 99.84 wt. %, 99.85 wt. %, 99.86 wt. %, 99.87 wt. %, 99.88 wt. %, 99.89 wt. %, 99.9 wt. %, 99.91 wt. %, 99.92 wt. %, 99.93 wt. %, 99.94 wt. %, 99.95 wt. %, 99.96 wt. %, 99.97 wt. %, 99.98 wt. %, and 99.99 wt. % of a random ethylene polypropylene copolymer.

The polymeric composition of the present disclosure can further contain at least 0.01 wt. %, such as 0.01 wt. % to 1.0 wt. %, or at least any one of, at most any one of, equal to any one of, or between any two of 0.01 wt. % to 1.0 wt. %, or at least any one of, at most any one of, equal to any one of, or between any two of 0.01 wt. %, 0.02 wt. %, 0.03 wt. %, 0.04 wt. %, 0.05 wt. %, 0.06 wt. %, 0.07 wt. %, 0.08 wt. %, 0.09 wt. %, 0.1 wt. %, 0.11 wt. %, 0.12 wt. %, 0.13 wt. %, 0.14 wt. %, 0.15 wt. %, 0.16 wt. %, 0.17 wt. %, 0.18 wt. %, 0.19 wt. %, 0.2 wt. %, 0.21 wt. %, 0.22 wt. %, 0.23 wt. %, 0.24 wt. %, 0.25 wt. %, 0.26 wt. %, 0.27 wt. %, 0.28 wt. %, 0.29 wt. %, 0.3 wt. %, 0.31 wt. %, 0.32 wt. %, 0.33 wt. %, 0.34 wt. %, 0.35 wt. %, 0.36 wt. %, 0.37 wt. %, 0.38 wt. %, 0.39 wt. %, 0.4 wt. %, 0.41 wt. %, 0.42 wt. %, 0.43 wt. %, 0.44 wt. %, 0.45 wt. %, 0.46 wt. %, 0.47 wt. %, 0.48 wt. %, 0.49 wt. %, 0.5 wt. %, 0.51 wt. %, 0.52 wt. %, 0.53 wt. %, 0.54 wt. %, 0.55 wt. %, 0.56 wt. %, 0.57 wt. %, 0.58 wt. %, 0.59 wt. %, 0.6 wt. %, 0.61 wt. %, 0.62 wt. %, 0.63 wt. %, 0.64 wt. %, 0.65 wt. %, 0.66 wt. %, 0.67 wt. %, 0.68 wt. %, 0.69 wt. %, 0.7 wt. %, 0.71 wt. %, 0.72 wt. %, 0.73 wt. %, 0.74 wt. %, 0.75 wt. %, 0.76 wt. %, 0.77 wt. %, 0.78 wt. %, 0.79 wt. %, 0.8 wt. %, 0.81 wt. %, 0.82 wt. %, 0.83 wt. %, 0.84 wt. %, 0.85 wt. %, 0.86 wt. %, 0.87 wt. %, 0.88 wt. %, 0.89 wt. %, 0.9 wt. %, 0.91 wt. %, 0.92 wt. %, 0.93 wt. %, 0.94 wt. %, 0.95 wt. %, 0.96 wt. %, 0.97 wt. %, 0.98 wt. %, 0.99 wt. %, and 1.0 wt. % of an acid neutralizer.

The polymeric composition of the present disclosure can further contain at least 0.01 wt. %, such as 0.01 wt. % to 1.0 wt. %, or at least any one of, at most any one of, equal to any one of, 0.01 wt. %, 0.02 wt. %, 0.03 wt. %, 0.04 wt. %, 0.05 wt. %, 0.06 wt. %, 0.07 wt. %, 0.08 wt. %, 0.09 wt. %, 0.1 wt. %, 0.11 wt. %, 0.12 wt. %, 0.13 wt. %, 0.14 wt. %, 0.15 wt. %, 0.16 wt. %, 0.17 wt. %, 0.18 wt. %, 0.19 wt. %, 0.2 wt. %, 0.21 wt. %, 0.22 wt. %, 0.23 wt. %, 0.24 wt. %, 0.25 wt. %, 0.26 wt. %, 0.27 wt. %, 0.28 wt. %, 0.29 wt. %, 0.3 wt. %, 0.31 wt. %, 0.32 wt. %, 0.33 wt. %, 0.34 wt. %, 0.35 wt. %, 0.36 wt. %, 0.37 wt. %, 0.38 wt. %, 0.39 wt. %, 0.4 wt. %, 0.41 wt. %, 0.42 wt. %, 0.43 wt. %, 0.44 wt. %, 0.45 wt. %, 0.46 wt. %, 0.47 wt. %, 0.48 wt. %, 0.49 wt. %, 0.5 wt. %, 0.51 wt. %, 0.52 wt. %, 0.53 wt. %, 0.54 wt. %, 0.55 wt. %, 0.56 wt. %, 0.57 wt. %, 0.58 wt. %, 0.59 wt. %, 0.6 wt. %, 0.61 wt. %, 0.62 wt. %, 0.63 wt. %, 0.64 wt. %, 0.65 wt. %, 0.66 wt. %, 0.67 wt. %, 0.68 wt. %, 0.69 wt. %, 0.7 wt. %, 0.71 wt. %, 0.72 wt. %, 0.73 wt. %, 0.74 wt. %, 0.75 wt. %, 0.76 wt. %, 0.77 wt. %, 0.78 wt. %, 0.79 wt. %, 0.8 wt. %, 0.81 wt. %, 0.82 wt. %, 0.83 wt. %, 0.84 wt. %, 0.85 wt. %, 0.86 wt. %, 0.87 wt. %, 0.88 wt. %, 0.89 wt. %, 0.9 wt. %, 0.91 wt. %, 0.92 wt. %, 0.93 wt. %, 0.94 wt. %, 0.95 wt. %, 0.96 wt. %, 0.97 wt. %, 0.98 wt. %, 0.99 wt. %, and 1.0 wt. % of a clarifier.

In some aspects, the polymeric composition of the present disclosure can further contain at least 0.01 wt. %, such as 0.01 wt. % to 0.3 wt. %, or at least any one of, at most any one of, equal to any one of, or between any two of 0.01 wt. %, 0.02 wt. %, 0.03 wt. %, 0.04 wt. %, 0.05 wt. %, 0.06 wt. %, 0.07 wt. %, 0.08 wt. %, 0.09 wt. %, 0.1 wt. %, 0.11 wt. %, 0.12 wt. %, 0.13 wt. %, 0.14 wt. %, 0.15 wt. %, 0.16 wt. %, 0.17 wt. %, 0.18 wt. %, 0.19 wt. %, 0.2 wt. %, 0.21 wt. %, 0.22 wt. %, 0.23 wt. %, 0.24 wt. %, 0.25 wt. %, 0.26 wt. %, 0.27 wt. %, 0.28 wt. %, 0.29 wt. %, and 0.3 wt. % of an antioxidant.

In some aspects, the polymeric composition of the present disclosure can further contain at least 0.01 wt. %, such as 0.01 wt. % to 0.3 wt. %, or at least any one of, at most any one of, equal to any one of, or between any two of 0.01 wt. %, 0.02 wt. %, 0.03 wt. %, 0.04 wt. %, 0.05 wt. %, 0.06 wt. %, 0.07 wt. %, 0.08 wt. %, 0.09 wt. %, 0.1 wt. %, 0.11 wt. %, 0.12 wt. %, 0.13 wt. %, 0.14 wt. %, 0.15 wt. %, 0.16 wt. %, 0.17 wt. %, 0.18 wt. %, 0.19 wt. %, 0.2 wt. %, 0.21 wt. %, 0.22 wt. %, 0.23 wt. %, 0.24 wt. %, 0.25 wt. %, 0.26 wt. %, 0.27 wt. %, 0.28 wt. %, 0.29 wt. %, and 0.3 wt. % of a stabilizer.

1. Random Ethylene Polypropylene Copolymer

The random ethylene polypropylene copolymer that can be used in the polymeric compositions of the present invention can be atactic, isotactic, or syndiotactic random propylene-ethylene random copolymer. In some aspects, the random ethylene polypropylene copolymer is an atactic random propylene-ethylene random copolymer. In some aspects, the random ethylene polypropylene copolymer is an isotactic random propylene-ethylene random copolymer. In some aspects, the random ethylene polypropylene copolymer is an syndiotactic random propylene-ethylene random copolymer.

The random ethylene polypropylene copolymer, such as the isotactic propylene-ethylene random copolymer, can include at least 4 wt. %, such as 4 wt. % to 12 wt. %, or at least any one of, at most any one of, equal to any one of, or between any two of 4 wt. %, 4.1 wt. %, 4.2 wt. %, 4.3 wt. %, 4.4 wt. %, 4.5 wt. %, 4.6 wt. %, 4.7 wt. %, 4.8 wt. %, 4.9 wt. %, 5 wt. %, 5.1 wt. %, 5.2 wt. %, 5.3 wt. %, 5.4 wt. %, 5.5 wt. %, 5.6 wt. %, 5.7 wt. %, 5.8 wt. %, 5.9 wt. %, 6 wt. %, 6.1 wt. %, 6.2 wt. %, 6.3 wt. %, 6.4 wt. %, 6.5 wt. %, 6.6 wt. %, 6.7 wt. %, 6.8 wt. %, 6.9 wt. %, 7 wt. %, 7.1 wt. %, 7.2 wt. %, 7.3 wt. %, 7.4 wt. %, 7.5 wt. %, 7.6 wt. %, 7.7 wt. %, 7.8 wt. %, 7.9 wt. %, 8 wt. %, 8.1 wt. %, 8.2 wt. %, 8.3 wt. %, 8.4 wt. %, 8.5 wt. %, 8.6 wt. %, 8.7 wt. %, 8.8 wt. %, 8.9 wt. %, 9 wt. %, 9.1 wt. %, 9.2 wt. %, 9.3 wt. %, 9.4 wt. %, 9.5 wt. %, 9.6 wt. %, 9.7 wt. %, 9.8 wt. %, 9.9 wt. %, 10 wt. %, 10.1 wt. %, 10.2 wt. %, 10.3 wt. %, 10.4 wt. %, 10.5 wt. %, 10.6 wt. %, 10.7 wt. %, 10.8 wt. %, 10.9 wt. %, 11 wt. %, 11.1 wt. %, 11.2 wt. %, 11.3 wt. %, 11.4 wt. %, 11.5 wt. %, 11.6 wt. %, 11.7 wt. %, 11.8 wt. %, 11.9 wt. %, and 12 wt. % ethylene units, and at least 88 wt. %, such as 88 wt. % to 96 wt. %, or least any one of, at most any one of, equal to any one of, or between any two of 88 wt. %, 88.1 wt. %, 88.2 wt. %, 88.3 wt. %, 88.4 wt. %, 88.5 wt. %, 88.6 wt. %, 88.7 wt. %, 88.8 wt. %, 88.9 wt. %, 89 wt. %, 89.1 wt. %, 89.2 wt. %, 89.3 wt. %, 89.4 wt. %, 89.5 wt. %, 89.6 wt. %, 89.7 wt. %, 89.8 wt. %, 89.9 wt. %, 90 wt. %, 90.1 wt. %, 90.2 wt. %, 90.3 wt. %, 90.4 wt. %, 90.5 wt. %, 90.6 wt. %, 90.7 wt. %, 90.8 wt. %, 90.9 wt. %, 91 wt. %, 91.1 wt. %, 91.2 wt. %, 91.3 wt. %, 91.4 wt. %, 91.5 wt. %, 91.6 wt. %, 91.7 wt. %, 91.8 wt. %, 91.9 wt. %, 92 wt. %, 92.1 wt. %, 92.2 wt. %, 92.3 wt. %, 92.4 wt. %, 92.5 wt. %, 92.6 wt. %, 92.7 wt. %, 92.8 wt. %, 92.9 wt. %, 93 wt. %, 93.1 wt. %, 93.2 wt. %, 93.3 wt. %, 93.4 wt. %, 93.5 wt. %, 93.6 wt. %, 93.7 wt. %, 93.8 wt. %, 93.9 wt. %, 94 wt. %, 94.1 wt. %, 94.2 wt. %, 94.3 wt. %, 94.4 wt. %, 94.5 wt. %, 94.6 wt. %, 94.7 wt. %, 94.8 wt. %, 94.9 wt. %, 95 wt. %, 95.1 wt. %, 95.2 wt. %, 95.3 wt. %, 95.4 wt. %, 95.5 wt. %, 95.6 wt. %, 95.7 wt. %, 95.8 wt. %, 95.9 wt. %, and 96 wt. % propylene units, based on the total weight of the copolymer.

In some aspects, the polypropylene copolymer such as the propylene-ethylene random copolymer can have a melt flow rate (MFR) of 0.1 g/10 min to 150 g/10 min, or 1 to 100 g/10 min, or 1 to about 50 g/10 min, or at least any one of, equal to any one of, or between any two of 0.1, 1, 2, 3, 4, 5, 6, 7, 8, 9, 10, 11, 12, 13, 14, 15, 16, 17, 18, 19, 20, 25, 30, 35, 40, 45, 50, 60, 70, 80, 90, 100, 110, 120, 130, 140, 150, and 160 g/10 min at 230° C., 2.16 kg, as measured in accordance with ASTM D-1238.

The polypropylene copolymer can be prepared via conventional polymerization processes such as those known in the art. Examples of such polymerization processes include slurry, liquid-bulk, and gas-phase polymerizations. In slurry polymerization processes, polymerization occurs in the presence of a solvent, e.g. hexane, within a loop or continuous stirred tank reactor. Polymerization may also be carried out by bulk-phase polymerization, where liquid propylene and ethylene serve as both monomer and diluent. In a typical bulk process, one or more loop reactors are generally employed. In other aspects, the copolymer may be produced by gas phase polymerization of propylene and ethylene, which is typically carried out in a fluidized bed reactor. Polymer fluff or powder produced from the polymerization reaction can be removed from the reactor and can then be processed via conventional techniques, such as by extrusion, to produce the desired copolymer pellets.

The amount of ethylene monomer used during polymerization of the copolymer is desirably in proportion to the desired final ethylene content of the target propylene copolymer. In some embodiments the ethylene content during polymerization can range from 4 wt. % to 12 wt. %, based on the total weight of the monomers, e.g. ethylene and propylene, present during polymerization. In some aspects, the polypropylene copolymer, such as propylene-ethylene random copolymer, can be prepared using metallocene catalysts or Ziegler-Natta catalysts.

Ziegler-Natta catalysts, which are well known in the art, are useful in the preparation of isotactic polypropylene and can be derived from a halide of a transition metal, such as titanium, chromium, or vanadium, and a metal hydride and/or metal alkyl, typically an organoaluminum compound, as a co-catalyst. In some aspects, the catalyst can contain a titanium halide supported on a magnesium compound. Ziegler-Natta catalysts, such as titanium tetrachloride ($TiCl_4$) supported on an active magnesium dihalide, such as magnesium dichloride or magnesium dibromide, as disclosed, for example, in U.S. Pat. Nos. 4,298,718 and 4,544,717, both to Mayr et al., incorporated by reference herein in their entirety, are supported catalysts. Silica may also be used as a support. The supported catalyst may be employed in conjunction with a co-catalyst or electron donor such as an alkylaluminum compound, for example, triethylaluminum (TEAL), trimethyl aluminum (TMA), and triisobutyl aluminum (TIBAL).

In specific aspects of the present disclosure, the random ethylene polypropylene copolymer is polypropylene Z9450 (TotalEnergies) having a MFR of 5 g/10 min at 230° C., 2.16 kg, as measured in accordance with ASTM D-1238. Polypropylene Z9450 is a low melting, high ethylene random copolymer with improved color, optics and impact properties. Z9450 resin processes on film extrusion equipment with typical melt temperatures of 193° C. to 227° C. Characteristics of polypropylene Z9450 are presented in the below table.

| | Method | Unit | Typical Value |
|---|---|---|---|
| Rheological Properties | | | |
| Melt Flow | D-1238 | g/10 min | 5 |
| Film Properties, Non-Oriented[1, 2, 3] | | | |
| Haze | D-1003 | % | 2 |
| Gloss | D-2457 | % | 85 |
| Ultimate Tensile | D-882 | psi (MPa) | 2,500 (17) |
| 1% Secant Modulus | D-882 | psi (MPa) | 50,000 (345) |
| WVTR @ 100° F., 90% RH | F-1249-90 | g/100 sq in/ 24 hrs/mil | 1.2 |
| Melting Point | DSC | ° F. (° C.) | 264 (129) |
| Dart Impact (F50) | D-1709 | g/mil | 270 |
| Heat Seal Temperature | | ° F. (° C.) | 234 (112) |
| Other Physical Properties | | | |
| Density | D-1505 | g/cc | 0.89 |

[1]Data developed under laboratory conditions and are not to be used as specification, maxima or minima.

[2]MP determined with a DSC-2 Differential Scanning Calorimeter.

[3]Minimum seal strength is 200 g/inch at 15 psi pressure and 1 §.

Polypropylene Z9450 Properties

2. Acid Neutralizer

The polymeric composition of the present disclosure includes acid neutralizer. In some aspects, the acid neutralizer can be a metal stearate, M-series catalyst neutralizers available from Mitsui Plastics, Inc. (e.g., M7L neutralizer), metallic oxides, hydrotalcite, or any combination thereof. In some aspects, metal stearate can be calcium stearate, zinc stearate, potassium stearate, sodium stearate, lithium stearate, aluminum stearate, magnesium stearate, manganese stearate, cobalt stearate, cerium stearate, copper stearate, ferric stearate, nickel stearate, or any combinations thereof. In some particular aspects, the metal stearate is calcium stearate. In some particular aspects, the acid neutralizer is an M-Series catalyst neutralizer (e.g., M3L, M7L, M37L, M70P, M737LP, or any combination thereof, each of which is commercially available neutralizer from Mitsui Plastics, Inc. (White Plains, New York)). The M-Series catalyst neutralizer can include a metal stearate/metal oxide mixture of calcium stearate, zinc stearate, and zinc oxide. In some aspects, the M-Series catalyst neutralizer is M7L.

In certain aspects, the polymeric composition of the present disclosure can contain at least 0.01 wt. %, such as 0.01 wt. % to 1.0 wt. %, or at least any one of, at most any one of, equal to any one of, or between any two of 0.01 wt. % to 1.0 wt. %, or at least any one of, at most any one of, equal to any one of, or between any two of 0.01 wt. %, 0.02 wt. %, 0.03 wt. %, 0.04 wt. %, 0.05 wt. %, 0.06 wt. %, 0.07 wt. %, 0.08 wt. %, 0.09 wt. %, 0.1 wt. %, 0.11 wt. %, 0.12 wt. %, 0.13 wt. %, 0.14 wt. %, 0.15 wt. %, 0.16 wt. %, 0.17 wt. %, 0.18 wt. %, 0.19 wt. %, 0.2 wt. %, 0.21 wt. %, 0.22 wt. %, 0.23 wt. %, 0.24 wt. %, 0.25 wt. %, 0.26 wt. %, 0.27 wt. %, 0.28 wt. %, 0.29 wt. %, 0.3 wt. %, 0.31 wt. %, 0.32 wt. %, 0.33 wt. %, 0.34 wt. %, 0.35 wt. %, 0.36 wt. %, 0.37 wt. %, 0.38 wt. %, 0.39 wt. %, 0.4 wt. %, 0.41 wt. %, 0.42 wt. %, 0.43 wt. %, 0.44 wt. %, 0.45 wt. %, 0.46 wt. %, 0.47 wt. %, 0.48 wt. %, 0.49 wt. %, 0.5 wt. %, 0.51 wt. %, 0.52 wt. %, 0.53 wt. %, 0.54 wt. %, 0.55 wt. %, 0.56 wt. %, 0.57 wt. %, 0.58 wt. %, 0.59 wt. %, 0.6 wt. %, 0.61 wt. %, 0.62 wt. %, 0.63 wt. %, 0.64 wt. %, 0.65 wt. %, 0.66 wt. %, 0.67 wt. %, 0.68 wt. %, 0.69 wt. %, 0.7 wt. %, 0.71 wt. %, 0.72 wt. %, 0.73 wt. %, 0.74 wt. %, 0.75 wt. %, 0.76 wt. %, 0.77 wt. %, 0.78 wt. %, 0.79 wt. %, 0.8 wt. %, 0.81 wt. %, 0.82 wt. %, 0.83 wt. %, 0.84 wt. %, 0.85 wt. %, 0.86 wt. %, 0.87 wt. %, 0.88 wt. %, 0.89 wt. %, 0.9 wt. %, 0.91 wt. %, 0.92 wt. %, 0.93 wt. %, 0.94 wt. %, 0.95 wt. %, 0.96 wt. %, 0.97 wt. %, 0.98 wt. %, 0.99 wt. %, and 1.0 wt. % of a metal stearate, such as calcium stearate.

Certain clarifiers, e.g., sorbitol-based clarifiers such as MILLAD® 3905, MILLAD® 3940, and MILLAD® 3988, are chemically sensitive to acidic species. Inadequate neutralization can cause the clarifier to be consumed via hydrolysis, thereby rendering it ineffective for acting primarily as a nucleator to yield fine crystallites smaller than the wavelength of light. Thus, in some aspects, inclusion of an acid neutralizer in the polymeric composition can reduce the haze value of the composition. Without wishing to be bound by theory, in some aspects, inclusion of an acid neutralizer in the polymeric composition can neutralize acidic species, thereby reducing the haze value of the composition and protecting processing equipment (e.g., metal mold surfaces).

3. Clarifier

In some aspects, the polymeric compositions of the present disclosure include a clarifier. In other aspects, the polymer compositions may not include a clarifier. In some aspects, the clarifier is a sorbitol-based clarifier, a nonitol-based clarifier, an amide-based clarifier, or any combinations thereof. In certain aspects, the sorbitol-based clarifier can be 1,3:2,4-dibenzylidenesorbitol (also known as MILLAD® 3905; Milliken), 1,3:2,4-bis(3,4-dimethylbenzylidene)sorbitol (also known as MILLAD® 3988; Milliken), 1,3:2,4-bis (p-methylbenzylidene)sorbitol (also known as MILLAD® 3940; Milliken), 1,3:2,4-Bis(3,4-dimethylobenzylideno)sorbitol (also known as MILLAD® 3988; Milliken), or combinations thereof. In certain aspects, the nonitol-based clarifier can be 1,2,3-trideoxy-4,6:5,7-bis-0-((4-propylphenyl) methylene) nonitol, also known as MILLAD® NX® 8000, sold by Milliken. In certain aspects, the amide-based clarifier can be N-[3,5-bis-(2,2-dimethyl-propionylamino)-phenyl]-2,2-dimethylpropionamide, also known as IRGA- CLEAR® XT 386, sold by BASF, N,N',N"-Tris(2-methylcyclohexyl)-1,2,3-propanetricarboxamide, also known as RIKACLEAR® PC1, sold by New Japan Chemical Co., Ltd., or combinations thereof.

In certain aspects, the polymeric composition can contain at least 0.01 wt. %, such as 0.01 wt. % to 1.0 wt. %, or at least any one of, at most any one of, equal to any one of, 0.01 wt. %, 0.02 wt. %, 0.03 wt. %, 0.04 wt. %, 0.05 wt. %, 0.06 wt. %, 0.07 wt. %, 0.08 wt. %, 0.09 wt. %, 0.1 wt. %, 0.11 wt. %, 0.12 wt. %, 0.13 wt. %, 0.14 wt. %, 0.15 wt. %, 0.16 wt. %, 0.17 wt. %, 0.18 wt. %, 0.19 wt. %, 0.2 wt. %, 0.21 wt. %, 0.22 wt. %, 0.23 wt. %, 0.24 wt. %, 0.25 wt. %, 0.26 wt. %, 0.27 wt. %, 0.28 wt. %, 0.29 wt. %, 0.3 wt. %, 0.31 wt. %, 0.32 wt. %, 0.33 wt. %, 0.34 wt. %, 0.35 wt. %, 0.36 wt. %, 0.37 wt. %, 0.38 wt. %, 0.39 wt. %, 0.4 wt. %, 0.41 wt. %, 0.42 wt. %, 0.43 wt. %, 0.44 wt. %, 0.45 wt. %, 0.46 wt. %, 0.47 wt. %, 0.48 wt. %, 0.49 wt. %, 0.5 wt. %, 0.51 wt. %, 0.52 wt. %, 0.53 wt. %, 0.54 wt. %, 0.55 wt. %, 0.56 wt. %, 0.57 wt. %, 0.58 wt. %, 0.59 wt. %, 0.6 wt. %, 0.61 wt. %, 0.62 wt. %, 0.63 wt. %, 0.64 wt. %, 0.65 wt. %, 0.66 wt. %, 0.67 wt. %, 0.68 wt. %, 0.69 wt. %, 0.7 wt. %, 0.71 wt. %, 0.72 wt. %, 0.73 wt. %, 0.74 wt. %, 0.75 wt. %, 0.76 wt. %, 0.77 wt. %, 0.78 wt. %, 0.79 wt. %, 0.8 wt. %, 0.81 wt. %, 0.82 wt. %, 0.83 wt. %, 0.84 wt. %, 0.85 wt. %, 0.86 wt. %, 0.87 wt. %, 0.88 wt. %, 0.89 wt. %, 0.9 wt. %, 0.91 wt. %, 0.92 wt. %, 0.93 wt. %, 0.94 wt. %, 0.95 wt. %, 0.96 wt. %, 0.97 wt. %, 0.98 wt. %, 0.99 wt. %, and 1.0 wt. % of a sorbitol-based clarifier. An example of a sorbitol-based clarifier can include 1,3:2,4-Bis(3,4-dimethylobenzylideno) sorbitol, also known as MILLAD® 3988 (Milliken).

In certain aspects, the polymeric composition can contain at least 0.01 wt. %, such as 0.01 wt. % to 1.0 wt. %, or at least any one of, at most any one of, equal to any one of, 0.01 wt. %, 0.02 wt. %, 0.03 wt. %, 0.04 wt. %, 0.05 wt. %, 0.06 wt. %, 0.07 wt. %, 0.08 wt. %, 0.09 wt. %, 0.1 wt. %, 0.11 wt. %, 0.12 wt. %, 0.13 wt. %, 0.14 wt. %, 0.15 wt. %, 0.16 wt. %, 0.17 wt. %, 0.18 wt. %, 0.19 wt. %, 0.2 wt. %, 0.21 wt. %, 0.22 wt. %, 0.23 wt. %, 0.24 wt. %, 0.25 wt. %, 0.26 wt. %, 0.27 wt. %, 0.28 wt. %, 0.29 wt. %, 0.3 wt. %, 0.31 wt. %, 0.32 wt. %, 0.33 wt. %, 0.34 wt. %, 0.35 wt. %, 0.36 wt. %, 0.37 wt. %, 0.38 wt. %, 0.39 wt. %, 0.4 wt. %, 0.41 wt. %, 0.42 wt. %, 0.43 wt. %, 0.44 wt. %, 0.45 wt. %, 0.46 wt. %, 0.47 wt. %, 0.48 wt. %, 0.49 wt. %, 0.5 wt. %, 0.51 wt. %, 0.52 wt. %, 0.53 wt. %, 0.54 wt. %, 0.55 wt. %, 0.56 wt. %, 0.57 wt. %, 0.58 wt. %, 0.59 wt. %, 0.6 wt. %, 0.61 wt. %, 0.62 wt. %, 0.63 wt. %, 0.64 wt. %, 0.65 wt. %, 0.66 wt. %, 0.67 wt. %, 0.68 wt. %, 0.69 wt. %, 0.7 wt. %, 0.71 wt. %, 0.72 wt. %, 0.73 wt. %, 0.74 wt. %, 0.75 wt. %, 0.76 wt. %, 0.77 wt. %, 0.78 wt. %, 0.79 wt. %, 0.8 wt. %, 0.81 wt. %, 0.82 wt. %, 0.83 wt. %, 0.84 wt. %, 0.85 wt. %, 0.86 wt. %, 0.87 wt. %, 0.88 wt. %, 0.89 wt. %, 0.9 wt. %, 0.91 wt. %, 0.92 wt. %, 0.93 wt. %, 0.94 wt. %, 0.95 wt. %, 0.96 wt. %, 0.97 wt. %, 0.98 wt. %, 0.99 wt. %, and 1.0 wt. % of a nonitol-based clarifier. An example of a nonitol-based clarifier can include 1,2,3-trideoxy-4,6:5,7-bis-0-((4-propylphenyl)methylene) nonitol, also known as MILLAD® NX® 8000 (Milliken).

In certain aspects, the polymeric composition can contain at least 0.01 wt. %, such as 0.01 wt. % to 1.0 wt. %, or at least any one of, at most any one of, equal to any one of, 0.01 wt. %, 0.02 wt. %, 0.03 wt. %, 0.04 wt. %, 0.05 wt. %, 0.06 wt. %, 0.07 wt. %, 0.08 wt. %, 0.09 wt. %, 0.1 wt. %, 0.11 wt. %, 0.12 wt. %, 0.13 wt. %, 0.14 wt. %, 0.15 wt. %, 0.16 wt. %, 0.17 wt. %, 0.18 wt. %, 0.19 wt. %, 0.2 wt. %, 0.21 wt. %, 0.22 wt. %, 0.23 wt. %, 0.24 wt. %, 0.25 wt. %, 0.26 wt. %, 0.27 wt. %, 0.28 wt. %, 0.29 wt. %, 0.3 wt. %, 0.31 wt. %, 0.32 wt. %, 0.33 wt. %, 0.34 wt. %, 0.35 wt. %, 0.36 wt. %, 0.37 wt. %, 0.38 wt. %, 0.39 wt. %, 0.4 wt. %, 0.41 wt. %, 0.42 wt. %, 0.43 wt. %, 0.44 wt. %, 0.45 wt. %, 0.46 wt. %, 0.47 wt. %, 0.48 wt. %, 0.49 wt. %, 0.5 wt. %, 0.51 wt. %, 0.52 wt. %, 0.53 wt. %, 0.54 wt. %, 0.55 wt. %, 0.56 wt. %, 0.57 wt. %, 0.58 wt. %, 0.59 wt. %, 0.6 wt. %, 0.61 wt. %, 0.62 wt. %, 0.63 wt. %, 0.64 wt. %, 0.65 wt. %, 0.66 wt. %, 0.67 wt. %, 0.68 wt. %, 0.69 wt. %, 0.7 wt. %, 0.71 wt. %, 0.72 wt. %, 0.73 wt. %, 0.74 wt. %, 0.75 wt. %, 0.76 wt. %, 0.77 wt. %, 0.78 wt. %, 0.79 wt. %, 0.8 wt. %, 0.81 wt. %, 0.82 wt. %, 0.83 wt. %, 0.84 wt. %, 0.85 wt. %, 0.86 wt. %, 0.87 wt. %, 0.88 wt. %, 0.89 wt. %, 0.9 wt. %, 0.91 wt. %, 0.92 wt. %, 0.93 wt. %, 0.94 wt. %, 0.95 wt. %, 0.96 wt. %, 0.97 wt. %, 0.98 wt. %, 0.99 wt. %, and 1.0 wt. % of an amide-based clarifier. An example of an amide-based clarifier can include N-[3,5-bis-(2,2-dimethyl-propionylamino)-phenyl]-2,2-dimethylpropionamide, also known as IRGACLEAR® XT 386 (BASF).

In certain aspects, the polymeric compositions of the present disclosure can be free of, or essentially free of, such as contain less than 750 parts per million (ppm), such as 750 ppm to 0 ppm, or at most or equal to any one of 0 ppm, 10 ppm, 20 ppm, 30 ppm, 40 ppm, 50 ppm, 60 ppm, 70 ppm, 80 ppm, 90 ppm, 100 ppm, 110 ppm, 120 ppm, 130 ppm, 140 ppm, 150 ppm, 160 ppm, 170 ppm, 180 ppm, 190 ppm, 200 ppm, 210 ppm, 220 ppm, 230 ppm, 240 ppm, 250 ppm, 260 ppm, 270 ppm, 280 ppm, 290 ppm, 300 ppm, 310 ppm, 320 ppm, 330 ppm, 340 ppm, 350 ppm, 360 ppm, 370 ppm, 380 ppm, 390 ppm, 400 ppm, 410 ppm, 420 ppm, 430 ppm, 440 ppm, 450 ppm, 460 ppm, 470 ppm, 480 ppm, 490 ppm, 500 ppm, 510 ppm, 520 ppm, 530 ppm, 540 ppm, 550 ppm, 560 ppm, 570 ppm, 580 ppm, 590 ppm, 600 ppm, 610 ppm, 620 ppm, 630 ppm, 640 ppm, 650 ppm, 660 ppm, 670 ppm, 680 ppm, 690 ppm, 700 ppm, 710 ppm, 720 ppm, 730 ppm, 740 ppm, and 750 ppm of a clarifier (e.g., a sorbitol-based clarifier, a nonitol-based clarifier, an amide-based clarifier, or combinations thereof). In some aspects, the polymeric composition includes less than 500 parts per million (ppm) of a clarifier. In some aspects, the polymeric composition includes less than 250 parts per million (ppm) of a clarifier. In certain aspects, the polymeric compositions does not include a clarifier.

In certain aspects, the polymeric compositions of the present disclosure can be free of, or essentially free of, such as contain less than 100 ppm, or less than 50 ppm, or less than 10 ppm, or less than 1 ppm, of a clarifying agent and/or a nucleating agent (e.g., a clarifying agent and/or a nucleating agent containing siloxane and/or a phosphate ester).

4. Additives

In some aspects, the polymeric composition of the present disclosure can further contain one or more additives selected from antioxidants, stabilizers, neutralizers, processing aids, peroxides, slip agents, brighteners, anti-block agents, light stabilizers, flow modifiers, antistatics, dyes, flame retardants, mold releasers, and/or pigments. In some aspects, the polymeric compositions of the present disclosure further include an antioxidant, a stabilizer, a peroxide, or any combinations thereof.

The antioxidant can be a sterically hindered phenol and/or a phosphite containing antioxidant. A combination of antioxidants can be used. In some aspects, the sterically hindered phenol antioxidant can be pentaerythritol tetrakis[3-[3,5-di-tert-butyl-4-hydroxyphenyl]propionate, octadecyl-3-[3,5-di-tert-butyl-4-hydroxyphenyl]propionate], pentaerythritol tetrakis[3-[3,5-di-tert-butyl-4-hydroxyphenyl]propionate, or 1,3,5-tris(3,5-di-tert-butyl-4-hydroxybenzyl)-1,3,5-triazine-2,4,6(1H,3H,5H)-trione, or any combinations thereof. In some aspects, the phosphite-containing antioxidant can be tris(2,4-di-tert.-butylphenyl)phosphite, bis(2,4-dicumylphenyl) pentaerythritol diphosphate, bis(2,4-di-t-butylphenyl) pentraerythritol diphosphate, or any combination thereof. In some particular aspects, the antioxidant can be pentaerythritol tetrakis[3-[3,5-di-tert-butyl-4-hydroxyphenyl]propionate (IRGANOX® 1010, BASF).

The stabilizer can be a phosphite-containing stabilizer and/or oligomeric hindered amine-containing stabilizer. In some aspects, the phosphite-containing stabilizer can be tris(2,4-di-tert.-butylphenyl)phosphite (IRGAFOS® 168, BASF). In some aspects, the oligomeric hindered amine-containing stabilizer can be butanedioic acid, dimethylester, polymer with 4-hydroxy-2,2,6,6-tetramethyl-1-piperidine ethanol, or any combination thereof.

The peroxide can be an organic peroxide. The organic peroxides can be hydroperoxides, peresters, peroxycarbonates, diacyl peroxides, ketone peroxides, dialkyl peroxides, perketals, or any combinations thereof. In some aspects, the organic peroxide can be 3,6,9-Triethyl-3,6,9-trimethyl-1,4,7-triperoxonane (TRIGONOX® 301) or an analog or derivative thereof, 2,5-dimethyl-2,5-di(tert-butylperoxy) hexane (LUPEROX® 101) or an analog or derivative thereof, or any combination thereof.

In some aspects, the polymeric composition can further contain at least 0.01 wt. %, such as 0.01 wt. % to 0.3 wt. %, or at least any one of, at most any one of, equal to any one of, or between any two of 0.01 wt. %, 0.02 wt. %, 0.03 wt. %, 0.04 wt. %, 0.05 wt. %, 0.06 wt. %, 0.07 wt. %, 0.08 wt. %, 0.09 wt. %, 0.1 wt. %, 0.11 wt. %, 0.12 wt. %, 0.13 wt. %, 0.14 wt. %, 0.15 wt. %, 0.16 wt. %, 0.17 wt. %, 0.18 wt. %, 0.19 wt. %, 0.2 wt. %, 0.21 wt. %, 0.22 wt. %, 0.23 wt. %, 0.24 wt. %, 0.25 wt. %, 0.26 wt. %, 0.27 wt. %, 0.28 wt. %, 0.29 wt. %, and 0.3 wt. % of a sterically hindered phenol. An example of a sterically hindered phenol can include pentaerythritol tetrakis[3-[3,5-di-tert-butyl-4-hydroxyphenyl]propionate.

In some aspects, the polymeric composition can further contain at least 0.01 wt. %, such as 0.01 wt. % to 0.3 wt. %, or at least any one of, at most any one of, equal to any one of, or between any two of 0.01 wt. %, 0.02 wt. %, 0.03 wt. %, 0.04 wt. %, 0.05 wt. %, 0.06 wt. %, 0.07 wt. %, 0.08 wt. %, 0.09 wt. %, 0.1 wt. %, 0.11 wt. %, 0.12 wt. %, 0.13 wt. %, 0.14 wt. %, 0.15 wt. %, 0.16 wt. %, 0.17 wt. %, 0.18 wt. %, 0.19 wt. %, 0.2 wt. %, 0.21 wt. %, 0.22 wt. %, 0.23 wt. %, 0.24 wt. %, 0.25 wt. %, 0.26 wt. %, 0.27 wt. %, 0.28 wt. %, 0.29 wt. %, and 0.3 wt. % of a phosphite-containing stabilizer. An example of a phosphite-containing stabilizer can include tris(2,4-di-tert.-butylphenyl)phosphite.

In some aspects, the polymeric composition can further contain at least 0.005 wt. %, such as 0.005 wt. % to 0.360 wt. %, or at least any one of, at most any one of, equal to any one of, or between any two of 0.005 wt. %, 0.006 wt. %, 0.007 wt. %, 0.008 wt. %, 0.009 wt. %, 0.01 wt. %, 0.011 wt. %, 0.012 wt. %, 0.013 wt. %, 0.014 wt. %, 0.015 wt. %, 0.016 wt. %, 0.017 wt. %, 0.018 wt. %, 0.019 wt. %, 0.02 wt. %, 0.021 wt. %, 0.022 wt. %, 0.023 wt. %, 0.024 wt. %, 0.025 wt. %, 0.026 wt. %, 0.027 wt. %, 0.028 wt. %, 0.029 wt. %, 0.03 wt. %, 0.031 wt. %, 0.032 wt. %, 0.033 wt. %, 0.034 wt. %, 0.035 wt. %, 0.036 wt. %, 0.037 wt. %, 0.038 wt. %, 0.039 wt. %, 0.04 wt. %, 0.041 wt. %, 0.042 wt. %, 0.043 wt. %, 0.044 wt. %, 0.045 wt. %, 0.046 wt. %, 0.047 wt. %, 0.048 wt. %, 0.049 wt. %, 0.05 wt. %, 0.051 wt. %, 0.052 wt. %, 0.053 wt. %, 0.054 wt. %, 0.055 wt. %, 0.056 wt. %, 0.057 wt. %, 0.058 wt. %, 0.059 wt. %, 0.06 wt. %, 0.061 wt. %, 0.062 wt. %, 0.063 wt. %, 0.064 wt. %, 0.065 wt. %, 0.066 wt. %, 0.067 wt. %, 0.068 wt. %, 0.069 wt. %, 0.07 wt. %, 0.071 wt. %, 0.072 wt. %, 0.073 wt. %, 0.074 wt. %, 0.075 wt. %, 0.076 wt. %, 0.077 wt. %, 0.078 wt. %, 0.079 wt. %, 0.08 wt. %, 0.081 wt. %, 0.082 wt. %, 0.083 wt. %, 0.084 wt. %, 0.085 wt. %, 0.086 wt. %, 0.087 wt. %, 0.088 wt. %, 0.089 wt. %, 0.09 wt. %, 0.091 wt. %, 0.092 wt. %, 0.093 wt. %, 0.094 wt. %, 0.095 wt. %, 0.096 wt. %, 0.097 wt. %, 0.098 wt. %, 0.099 wt. %, 0.1 wt. %, 0.101 wt. %, 0.102 wt. %, 0.103 wt. %, 0.104 wt. %, 0.105 wt. %, 0.106 wt. %, 0.107 wt. %, 0.108 wt. %, 0.109 wt. %, 0.11 wt. %, 0.111 wt. %, 0.112 wt. %, 0.113 wt. %, 0.114 wt. %, 0.115 wt. %, 0.116 wt. %, 0.117 wt. %, 0.118 wt. %, 0.119 wt. %, 0.12 wt. %, 0.121 wt. %, 0.122 wt. %, 0.123 wt. %, 0.124 wt. %, 0.125 wt. %, 0.126 wt. %, 0.127 wt. %, 0.128 wt. %, 0.129 wt. %, 0.13 wt. %, 0.131 wt. %, 0.132 wt. %, 0.133 wt. %, 0.134 wt. %, 0.135 wt. %, 0.136 wt. %, 0.137 wt. %, 0.138 wt. %, 0.139 wt. %, 0.14 wt. %, 0.141 wt. %, 0.142 wt. %, 0.143 wt. %, 0.144 wt. %, 0.145 wt. %, 0.146 wt. %, 0.147 wt. %, 0.148 wt. %, 0.149 wt. %, 0.15 wt. %, 0.151 wt. %, 0.152 wt. %, 0.153 wt. %, 0.154 wt. %, 0.155 wt. %, 0.156 wt. %, 0.157 wt. %, 0.158 wt. %, 0.159 wt. %, 0.16 wt. %, 0.161 wt. %, 0.162 wt. %, 0.163 wt. %, 0.164 wt. %, 0.165 wt. %, 0.166 wt. %, 0.167 wt. %, 0.168 wt. %, 0.169 wt. %, 0.17 wt. %, 0.171 wt. %, 0.172 wt. %, 0.173 wt. %, 0.174 wt. %, 0.175 wt. %, 0.176 wt. %, 0.177 wt. %, 0.178 wt. %, 0.179 wt. %, 0.18 wt. %, 0.181 wt. %, 0.182 wt. %, 0.183 wt. %, 0.184 wt. %, 0.185 wt. %, 0.186 wt. %, 0.187 wt. %, 0.188 wt. %, 0.189 wt. %, 0.19 wt. %, 0.191 wt. %, 0.192 wt. %, 0.193 wt. %, 0.194 wt. %, 0.195 wt. %, 0.196 wt. %, 0.197 wt. %, 0.198 wt. %, 0.199 wt. %, 0.2 wt. %, 0.201 wt. %, 0.202 wt. %, 0.203 wt. %, 0.204 wt. %, 0.205 wt. %, 0.206 wt. %, 0.207 wt. %, 0.208 wt. %, 0.209 wt. %, 0.21 wt. %, 0.211 wt. %, 0.212 wt. %, 0.213 wt. %, 0.214 wt. %, 0.215 wt. %, 0.216 wt. %, 0.217 wt. %, 0.218 wt. %, 0.219 wt. %, 0.22 wt. %, 0.221 wt. %, 0.222 wt. %, 0.223 wt. %, 0.224 wt. %, 0.225 wt. %, 0.226 wt. %, 0.227 wt. %, 0.228 wt. %, 0.229 wt. %, 0.23 wt. %, 0.231 wt. %, 0.232 wt. %, 0.233 wt. %, 0.234 wt. %, 0.235 wt. %, 0.236 wt. %, 0.237 wt. %, 0.238 wt. %, 0.239 wt. %, 0.24 wt. %, 0.241 wt. %, 0.242 wt. %, 0.243 wt. %, 0.244 wt. %, 0.245 wt. %, 0.246 wt. %, 0.247 wt. %, 0.248 wt. %, 0.249 wt. %, 0.25 wt. %, 0.251 wt. %, 0.252 wt. %, 0.253 wt. %, 0.254 wt. %, 0.255 wt. %, 0.256 wt. %, 0.257 wt. %, 0.258 wt. %, 0.259 wt. %, 0.26 wt. %, 0.261 wt. %, 0.262 wt. %, 0.263 wt. %, 0.264 wt. %, 0.265 wt. %, 0.266 wt. %, 0.267 wt. %, 0.268 wt. %, 0.269 wt. %, 0.27 wt. %, 0.271 wt. %, 0.272 wt. %, 0.273 wt. %, 0.274 wt. %, 0.275 wt. %, 0.276 wt. %, 0.277 wt. %, 0.278 wt. %, 0.279 wt. %, 0.28 wt. %, 0.281 wt. %, 0.282 wt. %, 0.283 wt. %, 0.284 wt. %, 0.285 wt. %, 0.286 wt. %, 0.287 wt. %, 0.288 wt. %, 0.289 wt. %, 0.29 wt. %, 0.291 wt. %, 0.292 wt. %, 0.293 wt. %, 0.294 wt. %, 0.295 wt. %, 0.296 wt. %, 0.297 wt. %, 0.298 wt. %, 0.299 wt. %, 0.3 wt. %, 0.301 wt. %, 0.302 wt. %, 0.303 wt. %, 0.304 wt. %, 0.305 wt. %, 0.306 wt. %, 0.307 wt. %, 0.308 wt. %, 0.309 wt. %, 0.31 wt. %, 0.311 wt. %, 0.312 wt. %, 0.313 wt. %, 0.314 wt. %, 0.315 wt. %, 0.316 wt. %, 0.317 wt. %, 0.318 wt. %, 0.319 wt. %, 0.32 wt. %, 0.321 wt. %, 0.322 wt. %, 0.323 wt. %, 0.324 wt. %, 0.325 wt. %, 0.326 wt. %, 0.327 wt. %, 0.328 wt. %, 0.329 wt. %, 0.33 wt. %, 0.331 wt. %, 0.332 wt. %, 0.333 wt. %, 0.334 wt. %, 0.335 wt. %, 0.336 wt. %, 0.337 wt. %, 0.338 wt. %, 0.339 wt. %, 0.34 wt. %, 0.341 wt. %, 0.342 wt. %, 0.343 wt. %, 0.344 wt. %, 0.345 wt. %, 0.346 wt. %, 0.347 wt. %, 0.348 wt. %, 0.349 wt. %, 0.35 wt. %, 0.351 wt. %, 0.352 wt. %, 0.353 wt. %, 0.354 wt. %, 0.355 wt. %, 0.356 wt. %, 0.357 wt. %, 0.358 wt. %, 0.359 wt. %, and 0.36 wt. %, of an organic peroxide, such 3,6,9-Triethyl-3,6,9-trimethyl-1,4,7-triperoxonane or an analog or derivative thereof, 2,5-dimethyl-2, 5-di(tert-butylperoxy)hexane or an analog or derivative thereof, or any combination thereof.

B. Polymeric Composition Properties

The polymeric composition can have a haze lower than the haze of random ethylene polypropylene copolymer, when measured under similar conditions. In some aspects, the polymeric compositions of the present disclosure can have a haze value at least 10% lower than the haze value of the random ethylene polypropylene copolymer, wherein the haze values are measured in accordance with ASTM D-1003, at a thickness of about 40 mil. In some aspects, the polymeric composition has a haze value 60% or less, 55% or less, 50% or less, 45% or less, 40% or less, 35% or less, 30% or less, 25% or less, 20% or less, 15% or less, 10% or less, or 3% to 60%, or at most any one of, equal to any one of, or between any two of 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60% less than the haze value of the random ethylene polypropylene copolymer, measured in accordance with ASTM D-1003, at a thickness of about 40 mil. In some particular aspects, the random ethylene polypropylene copolymer can have a melt flow rate (MFR) of 0.1 g/10 min to 150 g/10 min, or 1 to 100 g/10 min, or 1 to about 50 g/10 min, or at least any one of, equal to any one of, or between any two of 0.1, 1, 2, 3, 4, 5, 6, 7, 8, 9, 10, 11, 12, 13, 14, 15, 16, 17, 18, 19, 20, 25, 30, 35, 40, 45, 50, 60, 70, 80, 90, 100, 110, 120, 130, 140, 150, and 160 g/10 min at 230° C., 2.16 kg, as measured in accordance with ASTM D-1238, and the polymeric composition can have a haze value that is 25% or less, 20% or less, 15% or less, 10% or less, or 3% to 25%, or at most any one of, equal to any one of, or between any two of 3, 4, 5, 6, 7, 8, 9, 10, 11, 12, 13, 14, 15, 16, 17, 18, 19, 20, 21, 22, 23, 24 and 25% less than the haze value of the random ethylene polypropylene copolymer, measured in accordance with ASTM D-1003, at a thickness of about 40 mil. In some particular aspects, the random ethylene polypropylene copolymer can have a melt flow rate (MFR) of 5 to 35 g/10 min, at 230° C., 2.16 kg measured in accordance with ASTM D-1238, and the polymeric composition can have a haze value that is 25% or less, 20% or less, 15% or less, 10% or less, or 3% to 25%, or at most any one of, equal to any one of, or between any two of 3, 4, 5, 6, 7, 8, 9, 10, 11, 12, 13, 14, 15, 16, 17, 18, 19, 20, 21, 22, 23, 24 and 25% less than the haze value of the random ethylene polypropylene copolymer, measured in accordance with ASTM D-1003, at a thickness of about 40 mil. In some particular aspects, the random ethylene polypropylene copolymer can have a melt flow rate (MFR) of 5 to 35 g/10 min, at 230° C., 2.16 kg measured in accordance with ASTM D-1238, and the haze value of the polymeric composition is at least any one of, at most any one of, equal to any one of, or between any two of 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, or 40%.

The polymeric composition can have an impact strength greater than the impact strength of the random polypropylene copolymer, when measured under similar conditions. In some aspects, the polymeric composition has a notched Izod impact strength that is at most any one of, equal to any one of, or between any two of 1, 2, 3, 4, 5, 6, 7, 8, 9, 10, 11, 12, 13, 14, 15, 16, 17, 18, 19, or 20 times higher than the notched Izod impact strength of the random polypropylene copolymer, wherein the notched Izod impact strengths are measured in accordance with ASTM D-256 at 23° C. In some particular aspects, the random ethylene polypropylene copolymer can have a melt flow rate (MFR) of 0.1 g/10 min to 150 g/10 min, or 1 to 100 g/10 min, or 1 to about 50 g/10 min, or at least any one of, equal to any one of, or between any two of 0.1, 1, 2, 3, 4, 5, 6, 7, 8, 9, 10, 11, 12, 13, 14, 15, 16, 17, 18, 19, 20, 25, 30, 35, 40, 45, 50, 60, 70, 80, 90, 100, 110, 120, 130, 140, 150, and 160 g/10 min at 230° C., 2.16 kg, as measured in accordance with ASTM D-1238, and the polymeric composition can have an impact strength that is 25% or greater, 20% or greater, 15% or greater, 10% or greater, or 3% to 25%, or at most any one of, equal to any one of, or between any two of 3, 4, 5, 6, 7, 8, 9, 10, 11, 12, 13, 14, 15, 16, 17, 18, 19, 20, 21, 22, 23, 24 and 25% greater than the impact strength of the random ethylene polypropylene copolymer, measured in accordance with ASTM D-256, at a thickness of about 40 mil. In some particular aspects, the random ethylene polypropylene copolymer can have a melt flow rate (MFR) of 5 to 35 g/10 min, at 230° C., 2.16 kg measured in accordance with ASTM D-1238, and the polymeric composition can have an impact strength that is 25% or greater, 20% or greater, 15% or greater, 10% or greater, or 3% to 25%, or at most any one of, equal to any one of, or between any two of 3, 4, 5, 6, 7, 8, 9, 10, 11, 12, 13, 14, 15, 16, 17, 18, 19, 20, 21, 22, 23, 24 and 25% greater than the impact strength of the random ethylene polypropylene copolymer, measured in accordance with ASTM D-256, at a thickness of about 40 mil. In some particular aspects, the random ethylene polypropylene copolymer can have a melt flow rate (MFR) of 5 to 35 g/10 min, at 230° C., 2.16 kg measured in accordance with ASTM D-1238, and the impact strength of the polymeric composition is at least any one of, at most any one of, equal to any one of, or between any two of 1 ft-lb/in, 2 ft-lbs/in, 3 ft-lbs/in, 4 ft-lbs/in, 5 ft-lbs/in, 6 ft-lbs/in, 7 ft-lbs/in, 8 ft-lbs/in, 9 ft-lbs/in, 10 ft-lbs/in, 11 ft-lbs/in, 12 ft-lbs/in, 13 ft-lbs/in, 14 ft-lbs/in, 15 ft-lbs/in, 16 ft-lbs/in, 17 ft-lbs/in, 18 ft-lbs/in, 19 ft-lbs/in, 20 ft-lbs/in, 21 ft-lbs/in, 22 ft-lbs/in, 23 ft-lbs/in, 24 ft-lbs/in, 25 ft-lbs/in, 26 ft-lbs/in, 27 ft-lb s/in, 28 ft-lbs/in, 29 ft-lbs/in, or 30 ft-lbs/in.

In some aspects, the polymeric composition can have a tensile modulus of 80 Kpsi to 200 Kpsi, such as at least any one of, at most any one of, equal to any one of, or between any two of 80 Kpsi, 81 Kpsi, 82 Kpsi, 83 Kpsi, 84 Kpsi, 85 Kpsi, 86 Kpsi, 87 Kpsi, 88 Kpsi, 89 Kpsi, 90 Kpsi, 91 Kpsi, 92 Kpsi, 93 Kpsi, 94 Kpsi, 95 Kpsi, 96 Kpsi, 97 Kpsi, 98 Kpsi, 99 Kpsi, 100 Kpsi, 101 Kpsi, 102 Kpsi, 103 Kpsi, 104 Kpsi, 105 Kpsi, 106 Kpsi, 107 Kpsi, 108 Kpsi, 109 Kpsi, 110 Kpsi, 111 Kpsi, 112 Kpsi, 113 Kpsi, 114 Kpsi, 115 Kpsi, 116 Kpsi, 117 Kpsi, 118 Kpsi, 119 Kpsi, 120 Kpsi, 121 Kpsi, 122 Kpsi, 123 Kpsi, 124 Kpsi, 125 Kpsi, 126 Kpsi, 127 Kpsi, 128 Kpsi, 129 Kpsi, 130 Kpsi, 131 Kpsi, 132 Kpsi, 133 Kpsi, 134 Kpsi, 135 Kpsi, 136 Kpsi, 137 Kpsi, 138 Kpsi, 139 Kpsi, 140 Kpsi, 141 Kpsi, 142 Kpsi, 143 Kpsi, 144 Kpsi, 145 Kpsi, 146 Kpsi, 147 Kpsi, 148 Kpsi, 149 Kpsi, 150 Kpsi, 151 Kpsi, 152 Kpsi, 153 Kpsi, 154 Kpsi, 155 Kpsi, 156 Kpsi, 157 Kpsi, 158 Kpsi, 159 Kpsi, 160 Kpsi, 161 Kpsi, 162 Kpsi, 163 Kpsi, 164 Kpsi, 165 Kpsi, 166 Kpsi, 167 Kpsi, 168 Kpsi, 169 Kpsi, 170 Kpsi, 171 Kpsi, 172 Kpsi, 173 Kpsi, 174 Kpsi, 175 Kpsi, 176 Kpsi, 177 Kpsi, 178 Kpsi, 179 Kpsi, 180 Kpsi, 181 Kpsi, 182 Kpsi, 183 Kpsi, 184 Kpsi, 185 Kpsi, 186 Kpsi, 187 Kpsi, 188 Kpsi, 189 Kpsi, 190 Kpsi, 191 Kpsi, 192 Kpsi, 193 Kpsi, 194 Kpsi, 195 Kpsi, 196 Kpsi, 197 Kpsi, 198 Kpsi, 199 Kpsi, and 200 Kpsi, at 23° C., as measured in accordance with D-638.

In some aspects, the polymeric composition can have a flexural modulus of 50 Kpsi to 200 Kpsi, such as at least any one of, at most any one of, equal to any one of, or between any two of 50 Kpsi, 51 Kpsi, 52 Kpsi, 53 Kpsi, 54 Kpsi, 55 Kpsi, 56 Kpsi, 57 Kpsi, 58 Kpsi, 59 Kpsi, 60 Kpsi, 61 Kpsi, 62 Kpsi, 63 Kpsi, 64 Kpsi, 65 Kpsi, 66 Kpsi, 67 Kpsi, 68 Kpsi, 69 Kpsi, 70 Kpsi, 71 Kpsi, 72 Kpsi, 73 Kpsi, 74 Kpsi, 75 Kpsi, 76 Kpsi, 77 Kpsi, 78 Kpsi, 79 Kpsi, 80 Kpsi, 81 Kpsi, 82 Kpsi, 83 Kpsi, 84 Kpsi, 85 Kpsi, 86 Kpsi, 87 Kpsi, 88 Kpsi, 89 Kpsi, 90 Kpsi, 91 Kpsi, 92 Kpsi, 93 Kpsi, 94 Kpsi, 95 Kpsi, 96 Kpsi, 97 Kpsi, 98 Kpsi, 99 Kpsi, 100 Kpsi, 101 Kpsi, 102 Kpsi, 103 Kpsi, 104 Kpsi, 105 Kpsi, 106 Kpsi, 107 Kpsi, 108 Kpsi, 109 Kpsi, 110 Kpsi, 111 Kpsi, 112 Kpsi, 113 Kpsi, 114 Kpsi, 115 Kpsi, 116 Kpsi, 117 Kpsi, 118 Kpsi, 119 Kpsi, 120 Kpsi, 121 Kpsi, 122 Kpsi, 123 Kpsi, 124 Kpsi, 125 Kpsi, 126 Kpsi, 127 Kpsi, 128 Kpsi, 129 Kpsi, 130 Kpsi, 131 Kpsi, 132 Kpsi, 133 Kpsi, 134 Kpsi, 135 Kpsi, 136 Kpsi, 137 Kpsi, 138 Kpsi, 139 Kpsi, 140 Kpsi, 141 Kpsi, 142 Kpsi, 143 Kpsi, 144 Kpsi, 145 Kpsi, 146 Kpsi, 147 Kpsi, 148 Kpsi, 149 Kpsi, 150 Kpsi, 151 Kpsi, 152 Kpsi, 153 Kpsi, 154 Kpsi, 155 Kpsi, 156 Kpsi, 157 Kpsi, 158 Kpsi, 159 Kpsi, 160 Kpsi, 161 Kpsi, 162 Kpsi, 163 Kpsi, 164 Kpsi, 165 Kpsi, 166 Kpsi, 167 Kpsi, 168 Kpsi, 169 Kpsi, 170 Kpsi, 171 Kpsi, 172 Kpsi, 173 Kpsi, 174 Kpsi, 175 Kpsi, 176 Kpsi, 177 Kpsi, 178 Kpsi, 179 Kpsi, 180 Kpsi, 181 Kpsi, 182 Kpsi, 183 Kpsi, 184 Kpsi, 185 Kpsi, 186 Kpsi, 187 Kpsi, 188 Kpsi, 189 Kpsi, 190 Kpsi, 191 Kpsi, 192 Kpsi, 193 Kpsi, 194 Kpsi, 195 Kpsi, 196 Kpsi, 197 Kpsi, 198 Kpsi, 199 Kpsi, and 200 Kpsi, at 4-8 N as determined by ASTM D-790-97.

In some aspects, the polymeric composition can have a crystallization temperature of from about 90° C. to 120° C., such as at least any one of, at most any one of, equal to any one of, or between any two of 85° C. 86° C., 87° C., 88° C., 89° C., 90 oc, 91° C., 92° C., 93° C., 94° C., 95° C., 96° C., 97° C., 98° C., 99° C., 100° C., 101° C., 102° C., 103° C., 104° C., 105° C., 106° C., 107° C., 108° C., 109° C., 110° C., 111° C., 112° C., 113° C., 114° C., 115° C., 116° C., 117° C., 118° C., 119° C., and 120° C., as determined by Differential Scanning calorimetry (DSC) in accordance with ASTM D-3418D.

In some aspects, the polymeric composition can exhibit a "Color B" of less than 2, or 0 to 2, such as at least any one of, at most any one of, equal to any one of, or between any two of 0, 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, or 2, as measured in accordance with ASTM D-6290.

The polymeric composition can have any one of, any combination of, or all of the properties mentioned herein.

C. Methods for Making the Polymeric Compositions & Methods of Thermoforming

The polymeric composition of the present invention can be made by various methods known in the art. Non-limiting methods include extrusion, blow-molding, injection-molding, rotational molding, compression molding, thermoforming, or the like. For example, components such as the a random ethylene polypropylene copolymer, acid neutralizer, clarifier, and/or one or more additives can be mixed, such as dry blended, and then melt-blended, such as extruded, to form the polymeric composition. The extruder used can be any type of extruder known in the art. The extrusion can be performed at a temperature high enough to melt the composition, but as low as possible to avoid excessive thermal degradation of the components. Extrusion of the molten polymeric composition can occur at a temperature ranging from 150° C. to 315° C. or at least any one of, equal to any one of, or between any two of 150° C., 155° C., 160° C., 165° C., 170° C., 175° C., 180° C., 185° C., 190° C., 195° C., 200° C., 205° C., 210° C., 215° C., 220° C., 225° C., 230° C., 235° C., 240° C., 245° C., 250° C., 255° C., 260° C., 265° C., 270° C., 275° C., 280° C., 285° C., 290° C., 295° C., 300° C., 305° C., 310° C., and 315° C.

D. Articles Containing the Polymeric Compositions

The polymeric compositions of the present disclosure can be comprised in an article of manufacture. In some aspects, the article of manufacture can be an extruded, a blow-molded, a rotational-molded, an injection-molded, and/or thermoformed article. In some aspects, the article of manufacture can be transparent.

Non-limiting examples of articles of manufacture include: housewares, food storage containers, cooking utensils, plates, cups, measuring cups, drinking cups, strainers, turkey basters, non-food storage containers, filing cabinets and particularly clear drawers used in such cabinets, general storage devices, such as organizers, totes, sweater boxes, films, coatings and fibers, bags, adhesives, yarns, fabrics, bottles, jars, plates and cups, clamshells, and the like. Articles of manufacture can be rigid packaging, such as deli containers and lids including those used for dips, spreads, and pasta salads, dairy containers and lids including those used for storing cottage cheese, butter and yogurt, personal care products, and bottles and jars. In these and other uses, the resins may be combined with other materials, such as particulate materials, including talc, calcium carbonate, wood, and fibers, such as glass or graphite fibers, to form composite materials. Examples of such composite materials include components for furniture, automotive components, and building materials, particularly those used as lumber replacement.

EXAMPLES

The present invention will be described in greater detail by way of specific examples. The following examples are offered for illustrative purposes only, and are not intended to limit the invention in any manner. Those of skill in the art will readily recognize a variety of noncritical parameters which can be changed or modified to yield essentially the same results.

A. Example 1—(Low MFR Compositions Containing Random Ethylene Polypropylene Copolymer)

Polymeric compositions C-1 to C-6 were made with components as shown in Table 1. Formulations were made using Z9450 propylene-ethylene random copolymer (TotalEnergies) as the base fluff Historical NMR testing on Z9450 yields an ethylene concentration of 7.15 wt. %. Standard deviation in ethylene is ±0.85 wt. %.

Compositions C-1 to C-6 were formulated without peroxide and had a melt flow rate (MFR) of about 5±1 dg/min. Compositions C-1 to C-6 were injection molded as stepchips according to ASTM specifications at four different thicknesses (20, 40, 60, and 80 mil, where a mil is a measurement that equals one-thousandth of an inch, or 0.001 inch). Injection molding parameters used are provided in Table 2.

Calcium stearate was used as an acid neutralizer. Sorbitol-based clarifiers (e.g., MILLAD® 3905, MILLAD® 3940, and MILLAD® 3988), nonitol-based clarifiers (e.g., MILLAD® NX® 8000), and amide-based clarifiers (e.g., IRGACLEAR® XT 386) were also used to act as nucleators to yield fine crystallites smaller than the wavelength of light.

The optical properties of injection molded stepchips comprising Compositions C-1 to C-6 at the different thicknesses, as well as the mechanical properties of injection molded bars at a thickness of 3.2 mm (0.125 in), are provided in Table 3.

TABLE 1

C-1 to C-6 Polymeric Compositions

| Component | Polymeric Composition | | | | | |
|---|---|---|---|---|---|---|
| (wt. %) | C-1 | C-2 | C-3 | C-4 | C-5 | C-6 |
| Propylene-ethylene random copolymer | 99.62 | 99.62 | 99.17 | 99.7 | 98.97 | 99.8 |
| IRGANOX ® 1010 | 0.08 | 0.08 | 0.08 | 0.08 | 0.08 | 0.08 |
| IRGAFOS ® 168 | 0.05 | 0.05 | 0.05 | 0.05 | 0.05 | 0.05 |
| MILLAD ® 3988 | 0.2 | | | | | |
| Calcium stearate | 0.05 | 0.05 | 0.5 | 0.5 | 0.5 | 0.05 |
| MILLAD ® NX ® 8000 | | 0.2 | 0.2 | | 0.4 | |
| IRGACLEAR ® XT 386 | | | | | | 0.02 |
| DOW CORNING ® Siloxane MB | | | | 0.5 | | |

TABLE 2

C-1 to C-6 Polymeric Composition Injection Molding Parameters

| | Unit | Value |
|---|---|---|
| CONFIGURATION | | |
| Chiller Temperature | ° F. | 60 |
| Heater Temperature #1 | ° F. | 120 |
| Heater Temperature #2 | ° F. | 120 |
| EXTRUSION | | |
| H3 Temperature | ° F. | 420 |
| H2 Temperature | ° F. | 430 |
| H1 Temperature | ° F. | 440 |
| HN Temperature | ° F. | 440 |
| Back Pressure | psi | 1000 |
| INJECTION CONTROL | | |
| Injection Time | s | 20 |
| Cooling Time | s | 20 |
| Interval Time | s | 1.34 |
| Actual Cycle length | s | 45 |
| Screw Speed | % | 60 |
| SRN | rpm | 60 |
| Suck Back | mm | 6 |
| Cushion | mm | 6 |
| Injection Speed | % | 50 |

TABLE 3

C-1 to C-6 Polymeric Composition Properties

| Property | | Polymeric Composition | | | | | |
|---|---|---|---|---|---|---|---|
| | | C-1 | C-2 | C-3 | C-4 | C-5 | C-6 |
| Haze (%) | 20 mil | 7.1 | 7.8 | 7.9 | 20.4 | 7.2 | 6.8 |
| | 40 mil | 20.5 | 22.5 | 13.4 | 44.0 | 19.0 | 9.2 |
| | 60 mil | 35.0 | 35.0 | 13.2 | 62.4 | 26.6 | 12.3 |
| | 80 mil | 50.5 | 50.5 | 25.3 | 78.9 | 17.6 | 24.1 |
| Izod (ft-lb/in) | 3.2 mm | 9.55 | 9.08 | 8.84 | 3.1 | 8.58 | 9.96 |
| Break type | | Partial | Partial | Partial | Complete | Partial | Partial |

As can been seen from Table 3, compositions containing MILLAD® 3988 (a sorbitol-based clarifier; C-1), MILLAD® NX® 8000 (a nonitol-based clarifier; C-2, C-3, C-5), and IRGACLEAR® XT 386 (an amide-based clarifier; C-6) have good haze value and impact strength.

The impact of clarifier type was nuanced. For the sorbitol-based clarifiers, clarity was improved when a sufficient neutralizer was provided. C-3 formulated with 0.5 wt. % calcium stearate and 0.2 wt. % MILLAD® NX® 8000 yielded a 13.4% haze at 40 mil. The haze value was improved further for C-5 formulated with 0.5 wt. % calcium stearate and 0.4 wt. % MILLAD® NX® 8000, which yielded 9.7% haze at 40 mil. For amide-type clarifiers, a 9.2% haze was achieved at 40 mil with 0.05 wt. % calcium stearate and 0.02 wt. % IRGACLEAR® XT 386.

Clarifier in compositions 1 and 2, formulated with 0.05 wt. % calcium stearate neutralizer, was largely consumed (data not shown). Despite having little to no clarifier, compositions 1 and 2 were surprisingly clear and exhibited haze values of <25% at 40 mil. This result is much better than expected based on the literature: a random copolymer without clarifier typically has a haze of ≥40%, with levels ≥50% being common. See Maier et al., "High Efficiency Clarifier for Polypropylene," SPE International Polyolefins Conference (2007); Milliken M-307-02 (1993); Milliken M-307-07 (2000); Gahleitner et al., "Nucleation of Polypropylene Homo- and Copolymers," Intern. Polymer Processing XXVI (2011); and Lukaszewski and Hauck, "Polypropylene Clarification & Nucleation," Moscow International Conference (2008). A haze of <25% was therefore unexpected and has great potential for commercial importance. It is within the haze value range for some clarified homopolymers and is approaching the ≤20% haze typical for clarified RCPs.

Additionally, notched Izod impact strength was significantly >5 ft-lb/in for all compositions except C-4, which contains DOW CORNING® Siloxane MB. Results >5 ft-lb/in correspond to desirable "no break" performance.

B. Example 2—(High MFR Compositions Containing Random Ethylene Polypropylene Copolymer)

Polymeric compositions C-7 to C-17 were made with components (wt. %) as shown in Table 4. Formulations were made using Z9450 propylene-ethylene random copolymer (TotalEnergies) as the base fluff. Historical NMR testing on Z9450 yields an ethylene concentration of 7.15 wt %. Standard deviation in ethylene is ±0.85 wt %.

Compositions C-7 to C-17 were formulated with peroxide to vis-break the base 5 MFR powder to a pellet melt flow rate of either about 12±1 dg/min or about 35±1 dg/min. Compositions C-7 to C-17 were injection molded as stepchips according to ASTM specifications at a thickness of 40 mil, where a mil is a measurement that equals one-thousandth of an inch, or 0.001 inch. Injection molding parameters used are provided in Table 5. After molding, stepchips were kept at about 23° C. for eight weeks.

Calcium stearate or a proprietary neutralizer, M-7L (Mitsui Plastics, Inc.), was used as an acid neutralizer. Nonitol-based clarifiers (e.g., MILLAD® NX® 8000) and amide-based clarifiers (e.g., IRGACLEAR® XT 386) were also used to act as nucleators to yield fine crystallites smaller than the wavelength of light. The particulate nucleator Amfine NA-27 was also tested.

The optical properties of the injection molded stepchips comprising Compositions 7-17 measured at about 23° C. over the course of 8 weeks, as well as the mechanical properties measured at about 23° C. at week 0, are provided in Table 6.

TABLE 5

C-7 to C-17 Polymeric Composition Injection Molding Parameters

C-7 to C-11 Polymeric Compositions

| CONFIGURATION | Unit | Value |
|---|---|---|
| Chiller Temperature | ° F. | 60 |
| Heater Temperature #1 | ° F. | 90 |
| Heater Temperature #2 | ° F. | 90 |
| EXTRUSION | | |
| H3 Temperature | ° F. | 360 |
| H2 Temperature | ° F. | 370 |
| H1 Temperature | ° F. | 380 |
| HN Temperature | ° F. | 380 |
| Back Pressure | psi | 102 |
| INJECTION CONTROL | | |
| Injection Time | s | 20 |
| Cooling Time | s | 20 |
| Interval Time | s | 1.34 |
| Actual Cycle length | s | 45 |
| Screw Speed | % | 60 |
| SRN | rpm | 60 |
| Suck Back | mm | 6 |
| Cushion | mm | 6 |
| Injection Speed | % | 50 |

C-12 to C-17 Polymeric Compositions

| CONFIGURATION | Unit | Value |
|---|---|---|
| Chiller Temperature | ° F. | 60 |
| Heater Temperature #1 | ° F. | 90 |
| Heater Temperature #2 | ° F. | 90 |

TABLE 4

C-7 to C-17 Polymeric Compositions

| Component (wt. %) | Polymeric Composition C-7 | C-8 | C-9 | C-10 | C-11 | C-12 | C-13 | C-14 | C-15 | C-16 | C-17 |
|---|---|---|---|---|---|---|---|---|---|---|---|
| Propylene-ethylene random copolymer | 99.302 | 98.852 | 98.852 | 99.782 | 99.252 | 99.255 | 99.002 | 98.802 | 98.802 | 99.732 | 99.732 |
| IRGANOX ® 1010 | 0.08 | 0.08 | 0.08 | 0.08 | 0.08 | 0.08 | 0.08 | 0.08 | 0.08 | 0.08 | 0.08 |
| IRGAFOS ® 168 | 0.05 | 0.05 | 0.05 | 0.05 | 0.05 | 0.05 | 0.05 | 0.05 | 0.05 | 0.05 | 0.05 |
| Calcium stearate | 0.05 | 0.5 | | 0.05 | 0.5 | 0.05 | 0.3 | 0.5 | | 0.05 | |
| Mitsui M-7L | | | 0.5 | | | | | | 0.5 | | 0.05 |
| MILLAD ® NX ® 8000 | 0.5 | 0.5 | 0.5 | | | 0.5 | 0.5 | 0.5 | 0.5 | | |
| IRGACLEAR ® XT 386 | | | | 0.02 | | | | | | 0.02 | 0.02 |
| Amfine NA-27 | | | | | 0.1 | | | | | | |
| Peroxide | 0.018 | 0.018 | 0.018 | 0.018 | 0.018 | 0.065 | 0.068 | 0.068 | 0.068 | 0.068 | 0.068 |
| MFR (dg/min) | 12 | 12 | 12 | 12 | 12 | 35 | 35 | 35 | 35 | 35 | 35 |

TABLE 5-continued

| C-7 to C-17 Polymeric Composition Injection Molding Parameters | | |
|---|---|---|
| EXTRUSION | | |
| H3 Temperature | ° F. | 340 |
| H2 Temperature | ° F. | 350 |
| H1 Temperature | ° F. | 360 |
| HN Temperature | ° F. | 360 |
| Back Pressure | psi | 102 |
| INJECTION CONTROL | | |
| Injection Time | s | 20 |
| Cooling Time | s | 20 |
| Interval Time | s | 1.34 |
| Actual Cycle length | s | 45 |
| Screw Speed | % | 60 |
| SRN | rpm | 60 |
| Suck Back | mm | 6 |
| Cushion | mm | 6 |
| Injection Speed | % | 50 |

21411. This can be directly contrasted with the present propylene-ethylene random copolymer, which is between 98-100% ethylene propylene polymer and 0-2% modifiers and/or additives. Therefore, there is not a commercial Ziegler-Natta polypropylene random copolymer (RCP) with an MFR≥4 dg/min and a notched Izod >3 dg/min. Results for the impact strength of Compositions C-1 to C-3 and C-5 to C-6 (Example 1) and Compositions C-7 to C-10 and C-12 to C-17 comprising a pure propylene-ethylene random copolymer exceed that of any commercial North American RCP, as illustrated by the FIGURE, and emphasizes the MFR range accessible with the present approach.

Although embodiments of the present application and their advantages have been described in detail, it should be understood that various changes, substitutions and alterations can be made herein without departing from the spirit and scope of the embodiments as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the above disclosure, processes, machines, manufacture, compositions of matter, means, methods, or steps, presently existing or later to be developed that perform substantially the same function or achieve substantially the same result as the corresponding embodiments described herein can be utilized. Accordingly, the appended claims are intended to include within their scope such processes, machines, manufacture, compositions of matter, means, methods, or steps.

TABLE 6

C7-C17 Polymeric Composition Properties

| Property | | Polymeric Composition C-7 | C-8 | C-9 | C-10 | C-11 | C-12 | C-13 | C-14 | C-15 | C-16 | C-17 |
|---|---|---|---|---|---|---|---|---|---|---|---|---|
| Haze (%) | Week 0 | 7.11 | 5.68 | 9.90 | 10.3 | 42.1 | 6.83 | 6.88 | 6.88 | 10.8 | 11.7 | 11.2 |
| (40 mil plaques, | Week 4 | 6.95 | 6.56 | 11.6 | 11.3 | 44.0 | 6.87 | 5.17 | 5.89 | 11.5 | 12.1 | 12.1 |
| 23° C.) | Week 6 | 7.93 | 8.14 | 12.7 | 12.8 | 43.6 | 6.49 | 6.29 | 8.54 | 12.7 | 12.7 | 12.6 |
| | Week 8 | 8.28 | 9.00 | 13.9 | 12.5 | 43.6 | 7.82 | 5.95 | 9.28 | 13.3 | 12.6 | 11.8 |
| Izod (ft-lb/in, 23° C.) | | 6.73 | 6.54 | 6.30 | 8.05 | 2.33 | 5.28 | 5.23 | 5.24 | 4.68 | 6.04 | 6.22 |

As can been seen from Table 6, compositions containing MILLAD® NX® 8000 (a nonitol-based clarifier; C-8, C-9, C-13, C14-, C-15) and IRGACLEAR® XT 386 (an amide-based clarifier; C-10, C-16, C-17) have good haze value and impact strength.

Use of sorbitol-based clarifiers and amide-based clarifiers maintain clarity within the ranges typical for a clarified RCP at ≤20%. Two compositions formulated without clarifier, C-7 and C-12, were surprisingly clear and exhibited haze values of <10% at 40 mil over the course of 8 weeks. Thus, high clarity is possible without the use of a clarifier, and molded articles kept at room temperature can retain clarity for at least 2 months.

Use of a metal stearate, like calcium stearate, produced superior haze values over Mitsui Plastic Inc.'s proprietary neutralizer M-7L.

Additionally, notched Izod impact strength was significantly >3 ft-lb/in for all compositions except C-11, formulated with Amfine NA-27. Most compositions exhibited notched Izod impact strength >5 ft-lb/in, which corresponds to desirable "no break" performance. All formulations that were 1) nucleator/clarifier free, 2) formulated with a sorbitol-based clarifier like MILLAD® NX® 8000 or 3) formulated with an amide-based clarifier like IRGACLEAR® XT 386 had a notched Izod >4.5 ft-lb/in.

A survey of >90 North American RCP grades with a ≥4 MFR reveals that only one RCP (Polypropylene Copolymer Blend, Flint Hills) has an impact strength ≥3 ft-lb/in. However, the commercial RCP having an impact strength ≥3 ft-lb/in is not a pure random copolymer—it is a random copolymer blend, which can contain as little ethylene-propylene polymer as 70%. See Flint Hills Polypropylene Copolymer Blend Resources Safety Data Sheet (SDS) No.

The invention claimed is:

1. A polymeric composition comprising:

at least 98 wt. % of a random ethylene polypropylene copolymer, wherein the random ethylene polypropylene copolymer comprises 5.5 wt. % to 12 wt. % of ethylene units and 88 wt. % to 94.5 wt. % of propylene units based on the total weight of the copolymer; and 0.03 wt. % to 1.0 wt. % of an acid neutralizer, wherein the polymeric composition has a haze value of less than 40% as measured in accordance with ASTM D-1003; and wherein the polymeric composition has a notched Izod impact strength of greater than 3 ft-1b/in as measured in accordance with ASTM D-256.

2. The polymeric composition of any claim 1, wherein the polymeric composition includes a clarifier at 0.01 wt. % to 1.0 wt. %.

3. The polymeric composition of claim 1, wherein the polymeric composition includes less than 750 parts per million (ppm), less than 500 ppm, or less than 250 ppm of a clarifier.

4. The polymeric composition of claim 2, wherein the clarifier is a sorbitol based clarifier, a nonitol based clarifier, an amide based clarifier, or any combinations thereof.

5. The polymeric composition of claim 2, wherein the clarifier is 1,2,3-trideoxy-4,6:5,7-bis-0-((4-propylphenyl) methylene) nonitol, N-[3,5-bis-(2,2-dimethyl-propionylamino)-phenyl]-2,2-dimethylpropionamide, or any combinations thereof.

6. The polymeric composition of claim 1, wherein the polymeric composition does not include a clarifier.

7. The polymeric composition of claim 1, wherein the polymeric composition has a haze value A and the random ethylene polypropylene copolymer has a haze value B, wherein A≤0.75*B, and wherein A and B are measured in accordance with ASTM D-1003, at a thickness of about 40 mil.

8. The polymeric composition of claim 7, wherein A is equal to or less than 40%.

9. The polymeric composition of claim 1, wherein the polymeric composition has a notched Izod impact strength of C and the random polypropylene copolymer has a notched Izod impact strength of D, wherein C is ≥2*D, and wherein C and D are measured in accordance with ASTM D-256 at 23° C.

10. The polymeric composition of claim 9, wherein C is 3 ft-lbs/in or greater.

11. The polymeric composition of claim 1, wherein the polymeric composition comprises greater than 98 wt. % up to 99.8 wt. % of the random ethylene polypropylene copolymer.

12. The polymeric composition of claim 1, wherein the random ethylene polypropylene copolymer is a Ziegler-Natta random ethylene polypropylene copolymer.

13. The polymeric composition of claim 1, wherein the acid neutralizer is a metal stearate comprising calcium stearate, zinc stearate, potassium stearate, sodium stearate, lithium stearate, aluminum stearate, magnesium stearate, manganese stearate, cobalt stearate, cerium stearate, copper stearate, ferric stearate, nickel stearate, or any combinations thereof.

14. The polymeric composition of claim 1, further comprising one or more additives selected from an antioxidant, a stabilizer, a peroxide, a slip agent, an antistatic additive, an FR additive, a light stabilizer, a flow modifiers, a process aid, an anti-block agent, an optical brightener, or any combinations thereof.

15. The polymeric composition of claim 1, comprising:
- 98 wt. % to 99.8 wt. % of a Ziegler-Natta random ethylene polypropylene copolymer, comprising 5.5 wt. % to 12 wt. % of ethylene units and 88 wt. % to 94.5 wt. % of propylene units based on the total weight of the copolymer;
- 0.04 wt. % to 0.06 wt. %, of the acid neutralizer; and
- 0.1 wt. % to 0.3 wt. %, of a clarifier.

16. The polymeric composition of claim 15, wherein the acid neutralizer is a calcium stearate, and wherein the clarifier is 3,4-dimethylbenzylidene sorbitol.

17. The polymeric composition of claim 1, comprising:
- 98 wt. % to 99.8 wt. % of a Ziegler-Natta random ethylene polypropylene copolymer, comprising 5.5 wt. % to 12 wt. % of ethylene units and 88 wt. % to 94.5 wt. % of propylene units based on the total weight of the copolymer;
- 0.05 wt. % to 0.5 wt. %, of the acid neutralizer; and
- 0.2 wt. % to 0.4 wt. %, of a clarifier.

18. The polymeric composition of claim 17, wherein the acid neutralizer is calcium stearate, and wherein the clarifier is 1,2,3-trideoxy-4,6:5,7-bis-0-((4-propylphenyl)methylene) nonitol.

19. The polymeric composition of claim 1, comprising:
- 98 wt. % to 99.8 wt. % of a Ziegler-Natta random ethylene polypropylene copolymer, comprising 5.5 wt. % to 12 wt. % of ethylene units and 88 wt. % to 94.5 wt. % of propylene units, based on the total weight of the copolymer;
- 0.04 wt. % to 0.06 wt. %, of the acid neutralizer; and
- 0.01 wt. % to 0.03 wt. %, of a clarifier.

20. The polymeric composition of claim 19, wherein the acid neutralizer is calcium stearate, and wherein the clarifier is N-[3,5-bis-(2,2-dimethyl-propionylamino)-phenyl]-2,2-dimethylpropionamide.

21. The polymeric composition of claim 1, comprising:
- 98 wt. % to 99.8 wt. % of a Ziegler-Natta random ethylene polypropylene copolymer, comprising 5.5 wt. % to 12 wt. % of ethylene units and 88 wt. % to 94.5 wt. % of propylene units, based on the total weight of the copolymer;
- 0.05 wt. % to 0.5 wt. %, of the acid neutralizer; and
- 0.4 wt. % to 0.6 wt. %, of a clarifier.

22. The polymeric composition of claim 21, wherein the acid neutralizer is calcium stearate, and wherein the clarifier is 1,2,3-trideoxy-4,6:5,7-bis-0-((4-propylphenyl)methylene) nonitol.

23. The polymeric composition of claim 21, wherein the acid neutralizer is M7L, and wherein the clarifier is 1,2,3-trideoxy-4,6:5,7-bis-0-((4-propylphenyl)methylene) nonitol.

24. The polymeric composition of claim 1, comprising:
- 98 wt. % to 99.8 wt. % of a Ziegler-Natta random ethylene polypropylene copolymer, comprising 5.5 wt. % to 12 wt. % of ethylene units and 88 wt. % to 94.5 wt. % of propylene units, based on the total weight of the copolymer;
- 0.04 wt. % to 0.06 wt. %, of the acid neutralizer; and
- 0.01 to 0.03 wt. %, of a clarifier.

25. The polymeric composition of claim 21, wherein the acid neutralizer is calcium stearate, and wherein the clarifier is N-[3,5-bis-(2,2-dimethyl-propionylamino)-phenyl]-2,2-dimethylpropionamide.

26. The polymeric composition of claim 21, wherein the acid neutralizer is M7L, and wherein the clarifier is N-[3,5-bis-(2,2-dimethyl-propionylamino)-phenyl]-2,2-dimethylpropionamide.

27. The polymeric composition of claim 15, further comprising 0.01 wt. % to 0.3 wt. % of an antioxidant and 0.01 wt. % to 0.3 wt. % of a stabilizer.

28. The polymeric composition of claim 27, wherein the antioxidant is a hindered phenol-based antioxidant and the stabilizer is a phosphite-based stabilizer.

29. The polymeric composition of claim 1, wherein the composition is an extruded, a blow-molded, an injection-molded, rotational molded, compression molded, and/or thermoformed composition.

30. The polymeric composition of claim 1, wherein the composition is a sheet or film.

31. An article of manufacture comprising the polymeric composition of claim 1.

32. The article of manufacture of claim 31, wherein the article of manufacture is transparent.

33. The article of manufacture of claim 31, wherein the article of manufacture is a medical sharps container, tote, bins, pipettes, laboratory ware, food packaging container, food storage container, cooking utensil, plate, cup, cavity tray, drinking cup, measuring cup, strainer, turkey baster, non-food storage container, filing cabinet, cabinet drawer, general storage device, organizer, sweater box, rigid packaging, deli container, deli container lid, dairy container, dairy container lid, personal care product bottle and jar, furniture, furniture component, building material and building container components, film, coating, fiber, bag, adhesive, yarn and fabric blister, or clamshell.

* * * * *